US006426128B1

(12) United States Patent
Kimmel et al.

(10) Patent No.: US 6,426,128 B1
(45) Date of Patent: Jul. 30, 2002

(54) CO-PROCESSABLE MULTI-LAYER LAMINATES FOR FORMING HIGH STRENGTH, HAZE-FREE, TRANSPARENT ARTICLES AND METHODS OF PRODUCING SAME

(75) Inventors: Robert M. Kimmel, Simpsonville, SC (US); Arno Ewald Wolf, Charlotte, NC (US); John Arthur Penoyer, Greenville; Douglas Duane Roth, Taylors, both of SC (US)

(73) Assignee: HNA Holdings, Inc., Warren, NJ (US)

( * ) Notice: Subject to any disclaimer, the term of this patent is extended or adjusted under 35 U.S.C. 154(b) by 0 days.

(21) Appl. No.: 09/003,220

(22) Filed: Jan. 6, 1998

(51) Int. Cl.[7] .................. B32B 27/08; B32B 27/18; B32B 27/30; B32B 27/32; B32B 27/36

(52) U.S. Cl. .................. 428/1.6; 428/1.1; 428/35.7; 428/36.6; 428/36.7; 428/212; 428/213; 428/332; 428/412; 428/480; 428/483; 428/542.8

(58) Field of Search .................. 428/1.1, 1.6, 35.7, 428/36.6, 36.7, 412, 480, 483, 542.8, 910, 212, 213, 332

(56) References Cited

U.S. PATENT DOCUMENTS

| | | | |
|---|---|---|---|
| 3,869,056 A | | 3/1975 | Valyi .................. 215/1 C |
| 3,925,591 A | * | 12/1975 | Breitenfellner et al. ..... 428/483 |
| 3,955,697 A | | 5/1976 | Valyi .................. 215/1 C |
| 4,230,768 A | | 10/1980 | Hamada et al. |
| 4,327,137 A | | 4/1982 | Sawa et al. .................. 428/35 |
| 4,340,721 A | | 7/1982 | Bonnebat et al. .......... 528/272 |
| 4,414,226 A | | 11/1983 | Ikushima et al. ........... 424/279 |
| 4,414,230 A | | 11/1983 | Hanabata et al. .......... 426/106 |
| 4,414,266 A | | 11/1983 | Archer et al. .............. 428/287 |
| 4,415,727 A | | 11/1983 | Toga et al. .................. 528/272 |
| 4,473,682 A | | 9/1984 | Calundann et al. |
| 4,501,781 A | | 2/1985 | Kushida et al. ............... 428/35 |

(List continued on next page.)

FOREIGN PATENT DOCUMENTS

| | | |
|---|---|---|
| EP | 0 275 077 | 7/1988 |
| EP | 0 352 637 | 1/1990 |
| EP | 0 359 131 | 3/1990 |
| EP | 0 909 781 | 4/1990 |

(List continued on next page.)

OTHER PUBLICATIONS

Kirk–Othmer Encyclopedia of Chemical Technology, Third Edition, vol. 10, p. 216 (1980), Wiley Interscience Publications, John Wiley & Sons, New York.

(List continued on next page.)

Primary Examiner—Vivian Chen
(74) Attorney, Agent, or Firm—Burns, Doane, Swecker & Mathis, LLP

(57) ABSTRACT

Co-processable multi-layer laminates having a high $T_g$ layer and at least one low $T_g$ layer with layers having properties of high strength, lo- or no-haze, and transparency after processing into various multi-layer forms are useful for packaging and container applications. The multi-layer laminate has at least one low $T_g$ layer of a first thermoplastic polyester having at least one crystallization rate inhibitor. The total amount of crystallization rate inhibitor is effective to prevent substantial haze in the low $T_g$ layer upon heating. In most applications, the total amount of crystallization rate inhibitor also does not substantially inhibit strain-induced crystallization of the at least one low $T_g$ layer when the laminate is stretched during processing. The multi-layer laminates of the invention have improved properties such as reduced shrinkage and/or high barrier properties, with a very small amount of high $T_g$ material used to impart these improved properties to the laminate.

49 Claims, 1 Drawing Sheet

U.S. PATENT DOCUMENTS

| | | | |
|---|---|---|---|
| 4,535,901 A | 8/1985 | Okudaira et al. | 215/1 C |
| 4,550,043 A | 10/1985 | Beck | 428/36 |
| 4,711,624 A | 12/1987 | Watson | 425/384 |
| 4,713,269 A | 12/1987 | Jabarin et al. | 428/35 |
| 4,713,270 A | 12/1987 | Jabarin et al. | 428/35 |
| 4,717,624 A | 1/1988 | Ikenaga et al. | |
| 4,728,549 A | 3/1988 | Shimizu et al. | 428/35 |
| 4,743,479 A | 5/1988 | Nakamura et al. | 428/35 |
| 4,774,047 A | 9/1988 | Nakamura et al. | 264/513 |
| 4,803,036 A | 2/1989 | Maruhashi et al. | 264/526 |
| 4,816,308 A | 3/1989 | Shimizu et al. | 428/36.7 |
| 4,840,640 A | 6/1989 | Miura et al. | |
| 4,847,129 A | 7/1989 | Collette et al. | 428/35.7 |
| 4,861,630 A | 8/1989 | Mihalich | 428/34.1 |
| 4,868,026 A | 9/1989 | Shimizu et al. | 428/36.7 |
| 4,874,647 A | 10/1989 | Yatsu et al. | 428/35.7 |
| 4,994,313 A | 2/1991 | Shimizu et al. | 428/36.7 |
| 5,006,613 A | 4/1991 | Shepherd et al. | 525/444 |
| 5,024,850 A | 6/1991 | Broer et al. | |
| 5,035,931 A | 7/1991 | Yamada et al. | 428/35.7 |
| 5,059,356 A | 10/1991 | Nakamura et al. | |
| 5,068,136 A | 11/1991 | Yoshida et al. | 428/35.7 |
| 5,084,352 A | 1/1992 | Percec et al. | |
| 5,102,705 A | 4/1992 | Yammoto et al. | 428/36.92 |
| 5,115,047 A | 5/1992 | Hashimoto et al. | 525/444 |
| 5,132,147 A | 7/1992 | Takiguchi et al. | |
| 5,178,943 A * | 1/1993 | Asai et al. | 428/330 |
| 5,204,443 A | 4/1993 | Lee et al. | |
| 5,213,856 A | 5/1993 | Po' et al. | 428/34.1 |
| 5,227,456 A | 7/1993 | Shepherd et al. | |
| 5,261,545 A | 11/1993 | Ota et al. | 215/1 C |
| 5,266,676 A | 11/1993 | Po' et al. | 528/272 |
| 5,303,834 A | 4/1994 | Krishnakumar et al. | 215/1 C |
| 5,326,848 A | 7/1994 | Kashimura et al. | 528/190 |
| 5,344,912 A | 9/1994 | Dalgewicz, III et al. | 528/308.1 |
| 5,346,733 A | 9/1994 | Dalgewicz, III et al. | 428/35.7 |
| 5,352,401 A | 10/1994 | Dalgewicz, III et al. | 264/331.11 |
| 5,364,669 A | 11/1994 | Sumida et al. | 428/1 |
| 5,405,565 A | 4/1995 | Sumida et al. | 264/171 |
| 5,405,661 A | 4/1995 | Kim et al. | |
| 5,443,766 A | 8/1995 | Slat et al. | 264/37 |
| 5,445,784 A | 8/1995 | Sugiura et al. | 264/521 |
| 5,464,106 A | 11/1995 | Slat et al. | 215/12.1 |
| 5,512,625 A | 4/1996 | Butterbach et al. | |
| 5,589,236 A | 12/1996 | Harvey et al. | |
| 5,618,599 A | 4/1997 | Nulman et al. | |
| 5,628,957 A | 5/1997 | Collette et al. | 264/512 |
| 5,656,714 A | 8/1997 | Shen et al. | |
| 5,672,296 A | 9/1997 | Shen et al. | |
| 5,738,803 A | 4/1998 | Shepherd et al. | |
| 5,738,918 A | 4/1998 | Shen et al. | |
| 5,744,204 A | 4/1998 | Jester | |
| 5,753,145 A | 5/1998 | Teng et al. | |
| 5,863,622 A | 1/1999 | Jester | |

FOREIGN PATENT DOCUMENTS

| | | |
|---|---|---|
| EP | 0 503 065 | 9/1992 |
| EP | 0 608 924 | 8/1994 |
| EP | 0 763 423 | 3/1997 |
| GB | 2 091 629 | 1/1982 |
| GB | 2091629 | 8/1982 |
| JP | 61-097603 | 5/1986 |
| JP | 63-031729 | 5/1986 |
| JP | 63-195602 | 8/1988 |
| JP | 1-199841 | 8/1989 |
| JP | 2253919 | 10/1990 |
| JP | 2253920 | 10/1990 |
| JP | 2253950 | 10/1990 |
| JP | 2253951 | 10/1990 |
| JP | 2307751 | 12/1990 |
| JP | 4135750 | 5/1992 |
| JP | 5-169605 | 7/1993 |
| JP | 5-177796 | 7/1993 |
| JP | 5-177797 | 7/1993 |
| JP | 08146219 | 6/1996 |
| JP | 08216322 | 8/1996 |
| JP | 2539382 | 10/1996 |
| JP | 09131789 | 5/1997 |
| WO | WO92/18568 | 10/1992 |
| WO | WO93/24574 | 12/1993 |
| WO | WO 94/14350 | 7/1994 |
| WO | WO 95/08201 | 3/1995 |
| WO | WO95/23063 | 8/1995 |
| WO | WO95/23180 | 8/1995 |
| WO | WO96/00752 | 1/1996 |
| WO | WO 96/27492 | 9/1996 |
| WO | WO 96/38491 | 12/1996 |
| WO | WO96/38743 | 12/1996 |
| WO | WO96/38747 | 12/1996 |

OTHER PUBLICATIONS

"Films, Multilayer," by W. Schrenk and E. Veazey, *Encyclopedia of Polymer Science and Engineering*, vol. 7, p. 106 (1980).

Research Disclosure, vol. 294, No. 29410, Oct. 1988, New York, New York, pp. 714–719, XP00006866 Disclosed Anonymously, "Poly(Ethylene Naphthalenedicarboxylate/Poly(Ethylene Terephthalate) Blends".

Patent Abstracts of Japan, vol. 015, No. 339, Aug. 28, 1991 & JP 03 133640 A, Jun. 6,1991, *Abstract*.

Database WPI, Section Ch, Week 199235, Dewent Publications Ltd., London, GB; Class A32, AN 1992–288663 XP002164461 JP 04 197634 A (KAO CORP), Jul. 17, 1992 *Abstract*.

Database WPI, Section Ch, Week 198919, Derwent Publications Ltd., London, GB; XP002164462 & JP 01 085732 A (UNITIKA LTD), Mar. 30, 1989 *abstract*.

Patent Abstracts of Japan, vol 016, No. 434, Sep. 10,1992 & JP 04 148929 A (KAO CORP), May 21, 1992 *abstract*.

Database WPI, Section Ch, Week 198738, Derwent Publications Ltd., London, GB; Class A23, AN 1987–268072 XP002164464 & JP 62 187033 A (Mitsubishi Chem Ind Ltd), Aug. 15, 1987 *abstract*.

* cited by examiner

CO-PROCESSABLE MULTI-LAYER LAMINATES FOR FORMING HIGH STRENGTH, HAZE-FREE, TRANSPARENT ARTICLES AND METHODS OF PRODUCING SAME

FIELD OF THE INVENTION

The invention relates to co-processable multi-layer laminates having at least one substantially haze-free, high clarity, high strength transparent layer after processing into the form of a multi-layer sheet composition, an oriented film, a preform, a container including a food or beverage container, or another multi-layer structure, and methods of forming such laminate structures. The disclosures in this application are related to those in copending patent applications, Ser. Nos. 08/954,377; 08/954,378; 08/954,379; 08/954,997; and 08/955,000, all filed Oct. 20, 1997.

BACKGROUND OF THE INVENTION

Billions of containers and packaging products are manufactured each year for packaging food and beverage products and other household items. Various materials are used to manufacture these containers, depending on the particular use or application. Container manufacturers and food and beverage marketers must balance the design requirements for a packaging application against the economics of producing a given container. Design requirements may often include visually perceptible container properties such as surface gloss and reflectiveness, the clarity of the container wall, and the transparency and haze level of the container wall material. These visual properties have importance in the selection of a cost-effective packaging material for both functional and aesthetic reasons. The aesthetic elements of a packaging material choice may also be driven by consumer preference, because ultimately the consumer's decision to purchase a packaged product, for example a food or beverage, can be influenced by the appearance of the container. The functional aspects of these visual properties generally relate to container and/or product inspection, especially inspection of filled containers.

Glass containers are widely used and have properties of transparency and clarity, with little or no haze. These visual properties of glass will generally satisfy the functional and aesthetic requirements for a given container use. Glass containers also have gas barrier properties as well as heat resistance, making them suitable for packaging carbonated soft drinks and beer, as well as perishable products that are sensitive to oxygen and products which must be sterilized or hot-filled into containers at temperatures of 85° C. or more. The initial cost of glass containers is low, however, the efforts to recycle used glass containers have been hampered by the transportation expense involved in transporting the heavy glass containers to a recycle facility. These transportation expenses are also a cost factor when the glass containers are shipped to the user or when they are filled with new products and shipped to their point of sale. Moreover, glass containers are susceptible to breakage and inconvenient to handle.

On the other hand, containers made from plastic are often chosen by consumers and packagers due to their combination of light weight, durability and shatter resistance. Plastic containers may be formed from a variety of different polymers. Depending on the polymeric material selected, certain properties of the container may be achieved such as gas or water vapor barrier properties, impact strength, transparency and heat resistance.

Polyolefins such as polyethylene and polypropylene have barrier properties against water vapor, yet they are generally unsatisfactory from the standpoint of transparency and gloss. Polyvinyl chloride has gas barrier properties and is satisfactory in terms of transparency, but has inferior heat resistance. Polycarbonate has good transparency and sufficient heat resistance to withstand steam sterilization but does not have good gas and water vapor barrier properties.

Polyethylene terephthalate (PET) is widely used in the manufacture of containers for its excellent transparency and impact strength. In certain applications, polyethylene terephthalate also has satisfactory barrier properties against water vapor and gasses.

Polyethylene terephthalate is a crystallizable polymeric material which may exist in either an amorphous state or a crystallized state, or in a combination of both the amorphous and crystalline states. When heated to a temperature above its glass transition temperature and below its melting point, polyethylene terephthalate undergoes a transition from its amorphous state to its crystalline state, although this transition does not occur instantaneously. Similarly, when cooled slowly from its melting point to its glass transition point, polyethylene terephthalate undergoes crystallization, a transition from the amorphous phase to the crystalline phase. This transition does not occur instantaneously either, and substantially amorphous polyethylene terephthalate may be obtained by rapidly quenching from the melt, as is disclosed in U.S. Pat. No. 4,414,266 to Archer, et al.

Crystallization upon heating of a crystallizable polyester may be due to the further growth of existing crystals in the polymer or to the formation of new crystals, or both. Many physical and chemical properties of the polyester material change as the level of crystallinity increases and a variety of techniques are used to characterize the amount of crystallinity in a polymer. The crystallinity may be observed directly, for example by optical or electron microscopy techniques, or can be inferred by refraction techniques.

The crystallization behavior of polyesters such as polyethylene terephthalate is often determined by either a specific heat vs. temperature curve or a differential scanning calorimeter (DSC) curve, or both, for a sample of the polymer. At a temperature higher than the glass transition temperature ($T_g$), crystallization takes place, which is demonstrated both by a sharp drop in the specific heat curve and also by a sharp upward peak in the differential scanning calorimeter curve. The crystallization onset temperature of a polyester determined by differential scanning calorimetry is that temperature at which the exothermic crystallization reaction begins, or the beginning of the rise toward the peak of the exothermic crystallization reaction curve. The peak crystallization temperature of a polyester determined by differential scanning calorimetry is that temperature at which the exothermic crystallization reaction peaks. The crystallization onset temperature and the peak crystallization temperature determined by differential scanning calorimetry are both located in the range between the glass transition temperature and the melting temperature ($T_m$) of the material and they are both dependent upon polymer chain length and composition, and the heating rate.

Amorphous phase polymer chains may be axially or bi-axially oriented by applying force, in either one or two directions, respectively, to the polymeric material while it is above its glass transition temperature. Products such as biaxially oriented flat film and shaped objects such as cups thermoformed from flat sheet exhibit improved mechanical properties including dimensional stability, heat resistance and strength resulting from stretching and/or shaping at temperatures above $T_g$.

Characterization of the uniaxial drawing properties of PET sheet at processing temperatures above $T_g$ illustrates that the material yields in a controlled and uniform manner at such temperatures. At higher strain levels, i.e. draw ratios, the stress increases sharply and strain hardening occurs prior to rupture. Developing strength and rigidity via strain hardening is important in applications such as manufacturing containers for carbonated soft drinks and PET processing temperatures on the order of 85–100° C. are often used in such processes. If the resin temperature in such a process is increased to above 110° C., the polymer flows more and a much higher stretch is required to achieve a given degree of strain hardening. The amount of orientation attained at this higher stretch is less than that obtained at the same stretch ratio at lower temperatures. This results in lower strength in the hot stretched polymer, although shrinkage is reduced, presumably because of the lower degree of orientation.

Another process variable affecting properties in the stretched polymer is the strain rate. At high strain rates there is considerable molecular resistance to chain disentanglement and movement. Strain hardening will occur at lower stretch ratios as the strain rate is increased. Also, at high strain rates a higher degree of crystallinity is achieved in the product. Increased crystallinity results in product rigidity but at higher levels can result in brittleness and a resistance to molecular movement which may adversely impact product properties and the ability to be further processed.

Thus, polyester containers formed by biaxial orientation blow molding of preforms or parisons may have excellent strain induced rigidity and mechanical strength properties resulting from the strain induced orientation and strain induced crystallinity occurring in an optimized blow molding process. This strain induced orientation and strain induced crystallinity of the polymer chains is fixed in the polymer at room temperature. However, because the glass transition temperature of polyethylene terephthalate is about 70° C., when biaxially oriented containers of polyethylene terephthalate are used in a standard hot filling application with temperatures of at least about 85° C., the strain orientation in the softened polymer is released. When the biaxially oriented polyethylene containers are heated above their $T_g$, the strain oriented, straightened polymer molecule chains tend to reacquire their natural coil shape, which causes the blow molded container to shrink and distort.

Furthermore, if PET preforms or containers are heated to a temperature substantially above $T_g$, especially temperatures in excess of the normal 100° C. upper limit for processing PET discussed above, after a brief period of time (depending on the temperature) a visually perceptible whitening or hazing of the polymer occurs as a result of heat-induced crystalline growth.

U.S. Pat. No. 5,261,545 to Ota, et al. discloses a method for producing a biaxially oriented blow molded polyester resin container, in which only those portions of the container such as the neck and the bottom portions which are not substantially subjected to orientation in the blow molding process are heated and then annealed so as to increase the density of spherulite texture in those portions. The process improves the thermal resistance, stiffness and content resistance to the same extent as that which exists in the oriented cylindrical sections of the container, where the polymer molecules have been biaxially oriented. The container is disclosed as suitable for hot filling.

In the Yoshida, et al. U.S. Pat. No. 5,068,136, it is reported that heat set technology has been developed for heat setting polyethylene terephthalate containers by holding a wall portion of the blow molded container under heat treatment at 100–130° C. to remove residual strain, and that there also has been developed a technique of crystallizing and whitening the open end portion of the container with hot air or a heater. It is disclosed that these processes have resulted in heat resistant polyethylene terephthalate containers capable of being hot filled with contents having a temperature of as high as 85° C. However, these techniques are complicated and require substantial processing time and additional capital investment for heated molds.

U.S. Pat. No. 4,711,624 to Watson discloses an apparatus for making open ended thermoplastic tubular articles which are dimensionally stable at elevated temperatures. An open ended polymer tube is placed between a fixed, heated external mold and a cooled mandrel, which is vertically displaceable relative to the mold, and both ends of the polymer tube are clamped to restrain the polymer tube axially. The polymer tube is radially expanded into contact with the hot mold and maintained in contact for a sufficient time to ensure dimensional stability, and then allowed to shrink back into contact with the cooled mandrel. The mandrel is maintained at a temperature below the glass transition temperature of the polymer. It is disclosed that for manufacturing containers made of polyethylene terephthalate for food or beverage use, a suitable heat setting temperature for the mold is from 150–230° C., for a time period on the order of 5 seconds and with an applied pressure of at least 3.4 bars.

U.S. Pat. No. 5,445,784 to Sugiura, et al. discloses a multi-step process for making a heat resistant PET bottle beginning with heating the preform and blow molding it into a hot mold to form a primary intermediate molded bottle shaped piece, heating that primary piece to a higher temperature to form a secondary intermediate molded bottle shaped piece, and blow molding that secondary piece into a mold heated to a temperature that is hotter than the anticipated maximum service temperature for the heat resistant container. The container is disclosed as having no stress remaining from the biaxial orientation blow molding process.

U.S. Pat. No. 4,803,036 to Maruhashi, et al. reports that there are multi-step heat setting processes for improving the heat resistance of polyester containers, and a method in which heat setting is carried out simultaneously with draw-blow-forming in a blow-forming mold is considered preferable because of low equipment cost and the process having fewer steps. However, the manufacturing speed of this process is still low because of the relatively long residence time in the mold necessary for heat setting after the draw-blowing operation as well as cool down time prior to withdrawal of the container. According to the Maruhashi, et al. patent, in the process for the preparation of a hollow formed body wherein draw-blow-forming and heat setting of the molecular orientation are carried out simultaneously, it is expected that if the preform being draw-formed is maintained at as high a temperature as possible, heat setting will be possible while the preform is being draw-formed and the residence time of the formed container in the mold will be drastically shortened. However, preheating of the amorphous preform at a high temperature causes problems such as thermal deformation of the preform and thickness unevenness at the draw forming step. Also, whitening and reduction in drawability are caused by thermal crystallization of the polyester. U.S. Pat. No. 4,803,036 to Maruhashi, et al. discloses that by maintaining a hollow-forming mold, a polyester preform and air to be blown into the preform at predetermined levels, respectively, and using a high speed drawing process to draw the preform, the temperature of the preform becomes higher than the temperature of heat by internal friction or the temperature of heat by crystallization, and drawforming and heatsetting proceed simultaneously and a container with resistance to contraction is obtained at a high manufacturing speed. It is disclosed that the higher the drawing speed, the lower the amount of thermal contraction in the formed container when hot filled at 88° C. It is also disclosed that the higher the preform temperature, the lower the amount of thermal contraction in the formed container when hot filled. However, U.S. Pat. No. 4,803,036 discloses that when such a preform is heated to 115° C., the preform becomes crystallized and whitened, and also the formed bottle whitens. Furthermore, because the blowforming was performed while the preform was softened by the high temperature, thickness unevenness resulted as the axis of the bottle deviated from the axis of the preform. Accordingly, the thin portion of the bottle was readily deformed when hot filled. The thermoplastic polyester in U.S. Pat. No. 4,803,036 is disclosed as being composed mainly of ethylene terephthalate units as well as modified polyethylene terephthalate resins containing lower than 2% by weight of diethylene glycol.

U.S. Pat. Nos. 5,344,912, 5,346,733 and 5,352,401 to Dalgewicz III, et al. disclose a polyester article having a linear dimensional shrinkage between about 0% and 6% when heated from about −60 to about 200° C. as well as good gas barrier properties, obtained from a "melt-to-mold" process. The shaped polyester article is prepared by heating a composition of a substantially non-oriented crystallizable thermoplastic polyethylene terephthalate homopolymer to an amorphous state and maintaining the composition at a temperature above its peak crystallization rate temperature and contacting the composition with a shaping surface at or above that temperature for a time sufficient to provide a crystalline composition having an enthalpy of recrystallization of about 0.0 to about −2.1 calories per gram. The shaped article is then cooled at a rate of from about 5° to about 80° C. per minute. No haze or transparency values are reported for the polyester articles produced by the process.

Heat resistant materials may be used to form containers, such as the bottle disclosed in U.S. Pat. No. 5,102,705 to Yammoto, et al. which is made of polyethylene naphthalate resin and formed by stretching a preform so that the specific stretch index is 130 cm or more. The polyethylene naphthalate resin used for forming the bottle has 60 mole percent or more ethylene-2,6-naphthalate units and has a $T_g$ of about 120° C. or more. However, polyethylene naphthalate resins have a much greater cost than polyethylene terephthalate resins, so such a bottle is expensive to produce.

Often, as an alternative to employing complex processing techniques requiring added production time and/or additional capital outlay for special processing equipment or utilizing a high cost material in order to enhance the barrier, high temperature, or other performance characteristics of monolayer containers, multi-layer structures have been proposed to obtain the benefits of at least two different polymers in a single application. A layer of a polymer having heat resistance, high strength, and/or barrier properties, etc., may be added to the structure to produce a multi-layer laminate with improved properties. Combining layers of different polymers is a method generally used to form a multilayer laminate which takes advantage of the different properties which may be available in the different polymer layers while also using less of the more expensive polymer than if an entire container was manufactured from it.

Multilayer laminates, containers and other articles have numerous applications in industry, particularly for packaging applications. *Kirk-Othmer Encyclopedia of Chemical Technology*, Third edition, Volume 10, page 216 (1980), Wiley-Interscience Publication, John Wiley & Sons, New York, details generally the materials and processes required for making such articles as well as their applications. Another article of interest, for example, is "Films, Multilayer, " by W. Schrenk and E. Veazey, *Encyclopedia of Polymer Science and Engineering*, Vol. 7, 106 (1980). Generally, such articles are prepared by coprocessing individual polymers in injection or extrusion operations or by laminating individually formed layers together or by a combination of these processes. Coprocessing as discussed herein refers to forming and/or subsequently processing at least two layers of polymeric material. Common polymers used in these applications include polyethylene, polypropylene, ethylene-vinyl acetate copolymer, polyvinyl chloride, polyvinylidene chloride, polyamide, polyester, polycarbonate, polystyrene, acrylonitrile copolymers and the like. Desired properties in the laminates, films, sheets and the like, depend on the intended applications but generally include good mechanical properties such as tensile and impact strengths, processability, tear resistance, gas barrier properties, moisture barrier properties, optical properties, thermal and dimensional stability and the like.

However, the processes which may be used to shape multi-layer laminates, for example producing a container by one of the many available blow molding methods, often become more complex and unpredictable when multi-component polymeric materials are used such as blended resins and/or laminates.

Such methods of forming useful articles from multi-layer laminates often require that each layer of the laminate be stretched, expanded or extended in one or more directions, or deformed in some other way. This stretching, extending or other deformation may be carried out concurrently with the processing of forming the laminate or individual layers from the melt or may be part of a subsequent forming operation. Such methods of forming include but are not limited to, uniaxial and biaxially stretching of extruded films, thermoforming of multilayer laminates, blowing of extruded or injection-molded tubes and stretch blow molding of preforms or parisons.

Subsequent forming operations usually require the application of heat such that all of the layers are heated to above their $T_g$. For example, many methods of container formation require uniform stretching or expansion of the multilayer laminate at temperatures sufficient to stretch any polymeric material present in the laminate. It is advantageous to be able to coprocess the laminate, for example, to stretch or expand it without fracturing, tearing or otherwise destroying the integrity of any layer by creating defects within the layer. The creation of crystallinity in a layer of the laminate such that visually perceptible haze occurs and/or formability and stretchability are impacted may be considered a defect, depending on the particular application of the laminate.

U.S. Pat. No. 3,869,056 to Valyi discloses that whenever it is difficult to satisfy all of the requirements and specifications for a container by using a single plastic, a lined container, wherein the container wall is composed of more than one substance provides properties that no single plastic possesses.

U.S. Pat. Nos. 5,364,669 and 5,405,565 to Sumida, et al. both disclose composite films comprising a layer of liquid crystal polymer having gas barrier properties, an adhesive layer, and a thermoplastic layer formed from thermoplastics such as polyalkylene terephthalates, olefin polymers, nylons, polycarbonates and the like. The composite films are suitable as a food packaging material. Sumida, et al discloses that molten liquid crystal polymer may be biaxially stretched from the melt but should be extruded downward from the die to prevent the problems associated with low melt viscosity and weakness of the melted film which create difficulties when the molten liquid crystal polymer film is extruded upward from the die. Examples of the Sumida, et al. process are provided wherein Vectra[7] A900 (a trademark of Hoechst Celanese Corporation of Somerville, N.J.) wholly aromatic liquid crystal polyester resin is extruded at $290_1C$ at a blow ratio of 5.5 and a draft ratio of 6.0 to obtain a multiaxially oriented liquid crystal polymer film. Blow molding and stretch blow molding to obtain bottles or jars are not disclosed.

U.S. Pat. No. 5,326,848 to Kashimura, et al. discloses thermotropic liquid crystal polyesters produced by a hybrid copolymerization process wherein polyesters such as polyethylene terephthalate (PET), polyethylene naphthalate (PEN), or copolymers of PET and PEN are combined with conventional liquid crystal polyester structural units based on hydroxy naphthoic acid and hydroxy benzoic acid, or units based on hydroxy naphthoic acid alone. Kashimura, et al. proposes to achieve both excellent formability and gas barrier properties and discloses laminates having layers of the liquid crystal polyester compositions with layers of other polymers such as polyesters, polyolefins and polyamides to produce laminated containers such as cups and bottles. A polyester composition capable of preparing formed shapes by deep drawing an unstretched sheet is disclosed as comprising PET combined with units based on hydroxy naphthoic acid and hydroxy benzoic acid. However, it is disclosed that the gas barrier property of this deep drawing composition may sometimes be inferior to the gas barrier properties obtained by the other compositions disclosed which are not disclosed as suitable for deep drawing. In all of the liquid crystal polyester compositions disclosed by Kashimura, et al., an aliphatic dihydroxy component must be present in at least 15 mol percent in the liquid crystalline polyester. Although the formation of bottles and blow molding are disclosed, neither are demonstrated, nor are draw ratios for bottle formation or blow molding disclosed. Biaxial stretching of a film of the composition heated to $100_1C$ to $240_1C$ at a ratio of 3×3 is disclosed.

Other stretchable multilayer laminates and articles comprising an LCP layer have been proposed. For example, JP 5,177,797 A discloses that multilayer containers may be prepared from a laminate comprising layers of a thermoplastic resin and an LCP. Other disclosures of similar nature and of interest include, for example, JP 5,177,796 A; JP 1,199,841 A; JP 5,169,605 A; and WO 9,627,492 A.

U.S. Pat. No. 3,955,697 to Valyi discloses a heat resistant container with a barrier layer entrapped between two layers of a heat resistant plastic such as acetal polymers, polycarbonates, phenoxy resins, polysulfones, polyolefms, polyimines or ionomeric resins. The outer and inner layers may be the same or different. The barrier material is selected from the group consisting of polyvinylidene chloride, polyvinyl acetate, acrylonitrile polymers and methacrylonitrile. Valyi discloses that the liner is prepared from a laminate or sandwich so that in the resultant container the barrier layer is entrapped between two layers of a heat resistant plastic. In use, when the container of the present invention is exposed to elevated temperatures, the low melting layer entrapped between the heat resistant layers may, and probably will, soften, if not melt, depending upon the hot use temperature. However, because the low melting layer is entrapped and in substantial conformity with the adjoining protective layers, it lacks mobility and must remain in place. Thus, upon cooling, the lower melting layer will be restored to its normal condition without change.

Okudaira, et al. disclose in U.S. Pat. No. 4,535,901 and UK Patent Application GB 2091629A that in the case of successive injection laminate molding of a multi-ply parison, a molten crystalline thermoplastic resin which forms the inner layer, particularly a polyethylene terephthalate, is solidified in a transparent amorphous state by quenching. However, when the middle or the outer layer is formed subsequently as a molten resin, it is difficult to quench because the molten resin flows on the surface of the inner amorphous resin layer or the middle layer (in the case of the formation of the outer layer) and is cooled through the inner layer or both the inner and middle layers, and hence, the interfacial part of the layers becomes opaque due to heat crystallization of the resins of both layers. This interfacial crystallization disclosed by Okudaira, et al. not only causes deterioration of the blow moldability of the resulting multi-ply injection molded parison but also other disadvantages such as lowering of the interfacial adhesion between both resins and deterioration of the physical properties of the blow molded container. Okudaira, et al. discloses that in the formation of a multi-ply parison by injection molding, each resin should be injected and laminated to each other within a very short period of time and hence, even if a crystalline resin such as polyethylene terephthalate is used, the resin can be quenched without giving enough time to crystallize at the interfacial region. Thus, a high transparency, multi-ply parison is obtained. Three and five layer containers having innermost and outermost layers composed of thermoplastic polyester are preferred. Containers having heat resistance due to a central layer of polycarbonate and good barrier properties due to a central layer of metaxylylene group-containing polyamide are disclosed.

U.S. Pat. No. 4,550,043 to Beck reports that the method of Okudaira, et al. results in a preform having such a thick layer of central barrier material as to be economically unfeasible and discloses a five layer injection molded preform for forming blow molded containers having inner and outer first layers of a thermoplastic resin, thin inner and outer layers of a barrier material next to and between the inner and outer layers of thermoplastic resin, and a central layer of high temperature thermally stable material such as polycarbonate or acrylonitrile.

U.S. Pat. No. 4,847,129 to Collette, et al. reports that the preform disclosed by Beck in U.S. Pat. No. 4,550,043 has a core formed from a high temperature stability thermoplastic which is the major portion of the preform, and discloses a process of forming an injection molded preform for a container which is formed primarily of PET or similar saturated polyesters which are to be utilized in the packaging of hot fill liquids. The preform is of a laminated construction with the body of the preform being a five layer construction and the neck of the preform being primarily of a three layer construction including outer layers of PET and a core formed of a high $T_g$ polymer. The same high $T_g$ polymer that forms the core of the neck is present in the form of two thin layers in the body of the preform and located between the inner and outer layers and core of the body, which may be formed from PET. The high $T_g$ polymer may be polyethylene naphthalate, polycarbonate, polyarylate or other commercially available polymers with a $T_g$'s in excess of 90° C.

U.S. Pat. No. 5,035,931 to Yamada, et al. discloses a multi layer parison with a nine layer structure in the mouth section, with five of the layers being heat resistant resin layers such as polycarbonate, polyarylate, polyethylene naphthalate, polyacetal, polysulfone, polyether etherketone, polyethersulfone, polyetherimide, polyphenylenesulfide, blend polymers of these resins and blend polymers of one or more of these resins with polyethylene terephthalate. The other resin layers may be polyethylene terephthalate or another thermoplastic polyester or copolyester. The Yamada, et al. patent teaches away from the use of a heat resistant resin in the side wall portion of the container and discloses that the heat resistance in this portion of the container may be achieved by stretching and heat setting.

Multi-layered parisons of polyethylene terephthalate having barrier layers of a xylylene group-containing polyamide (MX nylon) resin to improve gas barrier properties are disclosed in U.S. Pat. No. 4,501,781 to Kushida, et al. and U.S. Pat. Nos. 4,728,549, 4,816,308, 4,868,026 and 4,994,313 to Shimizu, et al. However, the Shimizu, et al. patents disclose that the MX nylon resin has a poor affinity to thermoplastic polyesters such as polyethylene terephthalate. This defect is confirmed in the Yoshida, et al. U.S. Pat. No. 5,068,136, which reports that the five layered container disclosed in U.S. Pat. No. 4,728,549 to Shimizu, et al. undergoes delamination between the MX nylon containing layers (the two intermediate layers) and the layer of polyester (the innermost, central, and outermost layers) when an impact works on the container. This results in a loss of transparency at that portion of the container which undergoes interlayer delamination. U.S. Pat. No. 5,068,136 to Yoshida, et al. also reports that the container disclosed in U.S. Pat. No. 4,501,781 to Kushida, et al. has insufficient transparency and suffers container deformation and leakage when hot-filled at 85° C.

U.S. Pat. Nos. 4,743,479 and 4,774,047 to Nakamura, et al., disclose multi-layered containers of polyethylene terephthalate having a central heat resistant layer of a polyarylate polyethylene terephthalate resin or a polycarbonate resin. In U.S. Pat. No. 5,068,136 to Yoshida, et al., it is reported that polymers alloys obtained by melt blending polyethylene terephthalate and polyarylate have been used to form heat resistant containers, but that the moldability and barrier properties are degraded. Multi-layer containers using layers of polyarylate and polyethylene terephthalate resins such as those disclosed in U.S. Pat. Nos. 4,743,479 and 4,774,047 to Nakamura, et al., are reported as having poor oxygen barrier properties by U.S. Pat. No. 5,068,136.

U.S. Pat. No. 5,068,136 to Yoshida, et al. discloses a five-layered container formed by biaxial orientation blow molding of an injection-molded, five layered-structured parison. The central, innermost and outermost layers are a polyester resin containing ethylene terephthalate as a main recurring unit. The two intermediate layers between the innermost layer and the central layer and the outermost layer and the central layer comprise a resin B. Resin B comprises a mixture of a polyester resin containing ethylene terephthalate as a main recurring unit together with polyarylate or a resin produced by an ester exchange reaction of the polyester resin with polyarylate, and a m-xylylene group containing polyamide. It is disclosed that the injection molded parisons were heated to a surface temperature of 100–110° C., transferred to a container mold, and blow molded to yield a container having 4.45% haze and a volume contraction ratio of 1.2% at 85° C. It is also disclosed that modifying the polyethylene terephthalate resin of the central, innermost and outermost layers with 5% MX nylon results in a blow molded container having 19.7% haze and a volume contraction ratio of 1.6% at 85° C.

U.S. Pat. No. 5,115,047 to Hashimoto, et al., discloses that a copolyester mainly derived from isophthalic acid units having a high glass transition temperature and excellent thermal resistance is desirable and avoids the problems associated with obtaining an isophtalate containing copolyester by dry blending dried polyethylene terephthalate resin with a dried isophthalate-type copolyester having a low $T_g$. Specifically, the high $T_g$ isophthalate-type copolyester is derived from dicarboxylic acid units composed of 95–60 mole % isophthalic acid units and 5–40 mole % of 2,6-napthalenedicarboxylic acid units and dihydroxy compound units composed of 95–70 mole % of ethylene glycol units and 5–30 mole % of 1,3-bis(2-hydroxyethoxy)benzene units. The high $T_g$ isophthalate-type copolyester, in an amount of 5–50 per cent by weight, may be combined with 50–95 weight % of polyethylene terephthalate to form a polyester composition having a $T_g$ of 75–85° C. The polyethylene terephthalate that is combined with the copolyester to form a polyester composition may contain 10–20 mole % of dicarboxylic acid units or ethylene glycol units other than terephthalic acid and ethylene glycol, respectively. Both the isophthalate-type copolyester and the blend of PET/isophthalate copolyester may be laminated to layers of polyalkylene terephthalate, preferably polyethylene terephthalate. If the high $T_g$ isophthalate-type copolyester has an isophthalic acid content of more than 95 mole per cent, the resulting copolyester does not have a sufficiently high $T_g$, if the isophthalic acid content is less than 60 mole percent, the $T_g$ of the resulting copolyester is too high and a blend of the high $T_g$ isophthalate-type copolyester and polyethylene terephthalate, or a multi-layer laminate of the copolyester cannot be stretched sufficiently. A polyester container may be produced by the biaxial stretch blow molding method from an injection molded or extruded preform at a stretching temperature of 80–120° C. To improve the rigidity of the polyester container, a layer of polyethylene terephthalate may be laminated to the inside and outside layers of the polyester composition. Although excellent transparency and thermal resistance are disclosed by the Hashimoto, et al. patent for its laminated preforms and laminated blow molded articles, no hot fill shrinkage values were reported for stretch blow molded bottles.

U.S. Pat. No. 5,213,856 to Po', et al. discloses amorphous copolyesters wherein the acid component is derived from 50% to 80% by mole of isophthalic acid or a derivative thereof and 50% to 20% by mole of 2,6-naphthalene dicarboxylic acid or a derivative thereof. The copolyesters have oxygen barrier properties and a $T_g$ greater than or equal to 73° C. They may be coextruded between two or more layers of other polymers and formed into hollow containers.

U.S. Pat. No. 5,006,613 to Shepherd, et al., discloses blends of polyethylene terephthalate and polyethylene naphthalate and a compatibilizing amount of a copolyester having a high $T_g$ and suitable for forming hot fill containers having less than 10% haze. Laminates are not disclosed.

U.S. Pat. No. 4,874,647 to Yatsu, et al. discloses that a transparent polyethylene terephthalate having a sufficient heat resistance to withstand a hot filling operation while maintaining transparency has never been available. It is reported that prior methods for obtaining heat-resistant hollow containers from polyethylene terephthalate, including: (1) lamination of a heat-resistant resin such as polyarylate, (2) molding followed by heat setting, and (3) treatment of molded containers with a solvent to improve crystallinity, all impart heat resistance to the polyethylene terephthalate by using by using special molding means or by applying a treatment after molding. The Yatsu, et al. patent reports that containers produced by these methods were unsatisfactory in heat resistance and transparency when hot filled with juice. U.S. Pat. No. 4,874,647 to Yatsu, et al. discloses a heat resistant polycarbonate/polyester composition comprising 20–80 weight % polyalkylene terephthalate and 20–80 weight % bisphenol-A polycarbonate, the composition having a single glass transition temperature of from 80–130° C. A layer of the polycarbonate/polyester material may be laminated to a layer or layers of a polyalkylene terephthalate material having a $T_g$ of from 50–120° C. The layer of polyalkylene terephthalate material contains from 50 mole per cent to 100 mole per cent terephthalic acid units and may contain a minor proportion of aromatic dicarboxylic acid units other than terephthalic acid such as isophthalic acid, phthalic acid and naphthalene dicarboxylic acid. The laminated material may be formed by melt-coextrusion into a preform and stretched blow molded to form hollow containers for hot fill applications. The haze level of a press molded specimen of the high $T_g$ isophthalate-type copolyester is disclosed as 5.6% for a 70/30 weight ratio polyethylene terephthalate/polycarbonate composition having a $T_g$ of 84° C. As the amount of polycarbonate is increased in order to increase the $T_g$ of the high $T_g$ isophthalate-type copolyester, the haze values increase to greater values. No haze values are disclosed for stretch blow molded laminates having a polyalkylene terephthalate layer and a high $T_g$ isophthalate-type copolyester layer.

U.S. Pat. No. 4,327,137 to Sawa, et al. discloses a heat resistant container formed by direct blow molding prior to solidifying, after co-extruding by a method of intra-die laminating at least one layer of polycarbonate and at least one layer of a thermoplastic polyester without the use of an adhesive tie layer. It is disclosed that the transmission of parallel light for direct blow molded bottles is between 82–83%.

U.S. Pat. No. 4,414,230 to Hannabata, et al. discloses a plastic container having gas barrier properties and suitable for steam sterilization made from a thermoplastic resin composition having an aromatic polyester carbonate component and a component of polyalkylene terephthalate and/or a polyalkylene oxybenzoate.

U.S. Pat. No. 4,861,630 to Mihalich discloses that heat and impact resistant multilayered articles may be formed from thermoforming films obtained by co-extruding a layer of polycarbonate between two layers of polyester.

A hollow transparent delamination resistant heatset multilayer article is disclosed in U.S. Pat. No. 4,713,269 to Jabarin, et al. The article includes at least one high barrier layer containing a copolyester formed from terephthalic acid, ethylene glycol, 1,3 bis(2-hydroxyethoxybenzene), and, optionally, an amount of bis(4-beta-hydroxyethoxyphenyl)sulfone when it is necessary to raise the glass transition temperature for a particular application or use. A laminated structure of at least one layer of the high barrier copolyester directly adhered without adhesives to at least one layer of polyethylene terephthalate is disclosed. The PET materials disclosed as useful for forming the laminates of Jabarin, et al. are PET polymers including polymers where at least 97% of the polymer contains repeating ethylene terephthalate units with the remainder being minor amounts of ester-forming components, and copolymers of ethylene terephthalate wherein up to about 10 mole percent of the polymer is prepared from monomer units selected from butane-1,4-diol; diethylene glycol, propane-1,3-diol; poly(tetramethylene glycol); poly (ethylene glycol); poly(propylene glycol); 1,4-hydroxymethylcyclohexane and the like, substituted for the glycol moiety in the preparation of the polymer, or isophthalic; naphthalene, 1,4- or 2,6-dicarboxylic; adipic; sebacic; or decane-1,10-dicarboxylic acids, and the like, substituted for up to 10 mole percent of the acid moiety (terephthalic acid) in the preparation of the polymer. It is disclosed that the onset-of-shrinkage temperature for the high barrier copolyester/PET heatset container is essentially identical to that of a heatset PET monolayer container. Apparently the heat resistance of the container proposed by Jabarin, et al. results primarily from the heatsetting process and its effect on increasing the crystallinity in the PET layers. The heatsetting step is carried out at a temperature of 230° C. for 10 seconds. The blow molded, heat-set containers are disclosed as having over 50% crystallinity and low haze.

A high barrier heatset intimate fusion blend article is disclosed in U.S. Pat. No. 4,713,270 to Jabarin, et al. The article is made from a blend of PET and the high barrier copolyester of Jabarin, et al. '269 described above. It is disclosed that, in the heatsetting process, the PET in the fusion blended containers crystallizes very rapidly to a high crystallinity level in the presence of the high barrier copolyester. Thus, the copolyester acts as a crystallization promoter and increases the degree and rate of crystallization of the PET in the fusion blend, when compared to containers made solely of PET subjected to the same heatsetting conditions.

Another method of manufacturing preforms for blow molding heat resistant containers is disclosed in U.S. Pat. Nos. 5,443,766 and 5,464,106 and International Patent Application Number PCT/US95/08201 to Slat, et al. In the method, an insert is formed from one or more layers of thermoplastic, for example, by thermoforming flat sheets or forming a tubular coextrudate. The insert may contain a layer of heat resistant thermoplastic such as polyethylene naphthalate (PEN) or a blend of PEN and PET. The insert is placed into an injection mold and an outer layer of thermoplastic is injected to form the preform, which is then blow molded to form a multi-layer container. The thickness of the extruded intermediate layer of thermoplastic material may be varied, for example, to obtain a preform having a thinner layer of heat resistant material in the side walls and a thicker layer in the neck.

The co-processing of laminates containing more than one type of polymer may be difficult because of the different processing properties of the polymers. The optimum processing temperature for one polymer layer may create defects in the other layer during the processing of the laminate, and vice versa. For example, when multilayered preforms having a high $T_g$ layer and at least one low $T_g$ layer are processed (such as the PET/PEN/PET preforms disclosed in the Slat, et al. patents), defects may be created in the PET layers. The processing temperature for blow molding such a laminate is selected by considering the $T_g$ of the PEN (high $T_g$) material. Generally the processing temperature is at least about the $T_g$ of the high $T_g$ layer, preferably at least 10–15° C. greater than the $T_g$ of the high $T_g$ material, so that the high $T_g$ material may be easily stretched. The processing temperature for a laminate having a PEN layer ($T_g$·123° C.) is therefore at least about 135° C. When the preform is heated to this processing temperature, the polyethylene terephthalate layer or layers thermally crystallize and whiten before the preform can be blow molded, causing unacceptable haze in the blow molded container and also affecting the drawing properties of the crystallized polyethylene terephthalate layer or layers.

Crystallization rate inhibitors for polyethylene terephthalate are disclosed in U.S. Pat. No. 4,415,727 to Toga, et al., U.S. Pat. No. 5,266,676 to Po', et al. and U.S. Pat. No. 4,340,721 to Bonnebat, et al.

U.S. Pat. No. 4,415,727 to Toga, et al. discloses that it is important to minimize the crystallization of polyethylene terephthalate in the period between parison molding and blow molding and discloses a modified polyethylene terephthalate having 0.1 to 15 mol % of 2-methyl-1,3-propanediol as a glycol component of the PET to reduce crystallinity and the crystallization rate when blow molding thick walled bottles. U.S. Pat. No. 5,266,676 to Po', et al., discloses 2,6-naphthalene dicarboxylic acid polyester resins with low crystallization speed. The polyesters may be used for the manufacture of bottles. U.S. Pat. No. 4,340,721 to Bonnebat, et al. discloses a polyester having 92.5% to 98.5% of ethylene terephthalate recurring units and 1.5 mole per cent to 7.5 mole per cent of a comonomeric crystallization retardant selected from one or more of the polybasic acids and/or polyhydric alcohols such as isophthalic, napthalenedicarboxylic, adipic and sebacic acids, or their ester forming derivatives. Exemplary diols disclosed are neopentyl glycol, hexane-1,6-diol, bis-1,4-hydroxymethylcyclohexane, diethylene glycol and triethylene glycol. U.S. Pat. No. 4,415,727, U.S. Pat. No. 5,266,676 and U.S. Pat. No. 4,340,721 do not disclose multi-layer laminates.

Another approach to providing a hot-fillable container is disclosed in U.S. Pat. No. 5,303,834 to Krishnakumar, et al. The blow molded, biaxially oriented container disclosed is squeezable with a paneled sidewall and preferably is able to receive a hot fill product without undergoing excessive shape distortion. The container may be made from a variety of thermoplastic materials including PET copolymer having 4–6% by total weight of a comonomer such as 1,4-cyclohexanedimethanol and/or isophthalic acid. Multi-layer containers are not disclosed.

A container having a PEN/PET core layer and PET outer layers is disclosed as suitable for hot-fill applications in Research Disclosure, vol. 294, No. 29410, October 1988, New York, N.Y., USA, pp. 714–719, XP 000068665, Disclosed Anonymously, Poly (Ethylene Naphthalenedicarboxylate)/Poly (Ethylene Terephthalate) Blends. The PEN/PET blends may contain from 1% to 99% PET. The material suitable as outer layer material is preferably a linear polyester such as PET or various commercially available versions thereof, such as PET modified with up to 50 mol percent of an aromatic or aliphatic dicarboxylic acid and/or up to 50 mol percent of an aliphatic glycol containing 3 to 12 carbon atoms.

U.S. Pat. Nos. 5,628,957 and International Patent Application Number PCT/US94/14350 to Collette, et al. disclose a multi-layer preform and container having a layer of a first polymer comprising PEN and a layer of a second polymer which remains substantially transparent after being stretched at a temperature above the orientation temperature of the first polymer. Various second polymer compositions are disclosed including: a PET low copolymer (0–2%); a PET high copolymer; a non-strain hardenable PET, or a non-strain hardenable blend or copolymer of PEN and PET copolymer; a PET copolymer having 30% cyclohexane dimethanol (PETG); a blend or copolymer of PETG and PEN; a mid-PEN polymer comprising 20–80% PEN and 20–80% PET; a high-PEN polymer comprising 80–100% PEN and 0–20% PET; and a high-PEN polymer comprising 80–100% PEN and 0–20% PET low copolymer.

It would be desirable to produce a co-processable multi-layer laminate having properties of high strength, transparency, low or no haze in the low cost, low $T_g$ laminate layers, and furthermore, to produce such a laminate in a cost effective manner wherein the amount of high cost, high $T_g$ materials are optimized to attain the desired end use properties of the laminate at the lowest possible cost. It would be desirable for such a laminate to have a high $T_g$ layer having not only the desired end use properties of the laminate such as high barrier properties and/or heat resistance but also high strength. The high $T_g$ material would be used in such proportion in the laminate wherein the laminate has the best properties of the high value, high $T_g$ material without any excess used, thus achieving an optimized amount of the high $T_g$ material.

It would also be desirable for such a laminate to have a low $T_g$ layer having high strength, transparency and relatively no haze with crystallization rate inhibitors used in such proportion in the low $T_g$ layer or layers of the laminate wherein the laminate has the best properties of the high value crystallization rate inhibitors without any excess being used, thus achieving an optimized amount of the crystallization rate inhibitors to attain both low or no haze and high strain induced crystallinity and accordingly high strength in the low $T_g$ layer.

SUMMARY OF THE INVENTION

The present invention provides a co-processable multi-layer laminate having a high $T_g$ layer and at least one low $T_g$ layer. The layers have properties of high strength, lo- or no-haze, and transparency after processing into the form of a multi-layer sheet composition, an oriented film, a preform, a container including a food or beverage container, or another multi-layer structure. The present invention also provides methods of forming such laminate structures.

The multi-layer laminate has at least one low $T_g$ layer comprising a first thermoplastic polyester, the first thermoplastic polyester comprising at least one crystallization rate inhibitor. The total amount of crystallization rate inhibitor is effective to prevent substantial haze in the low $T_g$ layer upon heating the high $T_g$ layer to a processing temperature above the $T_g$ of the high $T_g$ layer and stretching the laminate at the processing temperature, such that the at least one low $T_g$ layer, after heating and stretching, is substantially transparent. Furthermore, in embodiments of the invention, the total amount of crystallization rate inhibitor does not substantially inhibit strain-induced crystallization of the at least one low $T_g$ layer when the laminate is stretched at the processing temperature, such that the at least one low $T_g$ layer, after heating and stretching, is substantially transparent and has high strength.

The present invention also provides multilayer structures that have a reduced amount of haze generated from thermal processing of crystalline thermoplastic polyesters in temperature ranges above their $T_g$. These multilayer structures also may exhibit strain induced crystallization when the structure is stretched, and the effective amount of crystallization inhibitor does not substantially inhibit the strain induced crystallization.

The present invention provides a co-processable multi-layer laminate having properties of high strength, transparency, low or no haze in the low cost, low $T_g$ laminate layers, and furthermore, provides a laminate wherein the amount of high cost, high $T_g$ materials are optimized to attain the desired end use properties of the laminate at the lowest possible cost, for example, in the case wherein the high $T_g$ layer has desired end use properties such as high barrier properties, heat resistance, and high strength. The high $T_g$ material is used in such proportion in the laminate wherein the laminate has the best properties of the high value, high $T_g$ material without any excess used, thus achieving an optimized amount of the high $T_g$ material.

The multilayer containers of the invention may provide improved properties such as reduced shrinkage and/or high barrier properties, with a very small amount of high $T_g$ material used to impart the improved properties to the container.

DETAILED DESCRIPTION OF THE INVENTION

Figure 1:
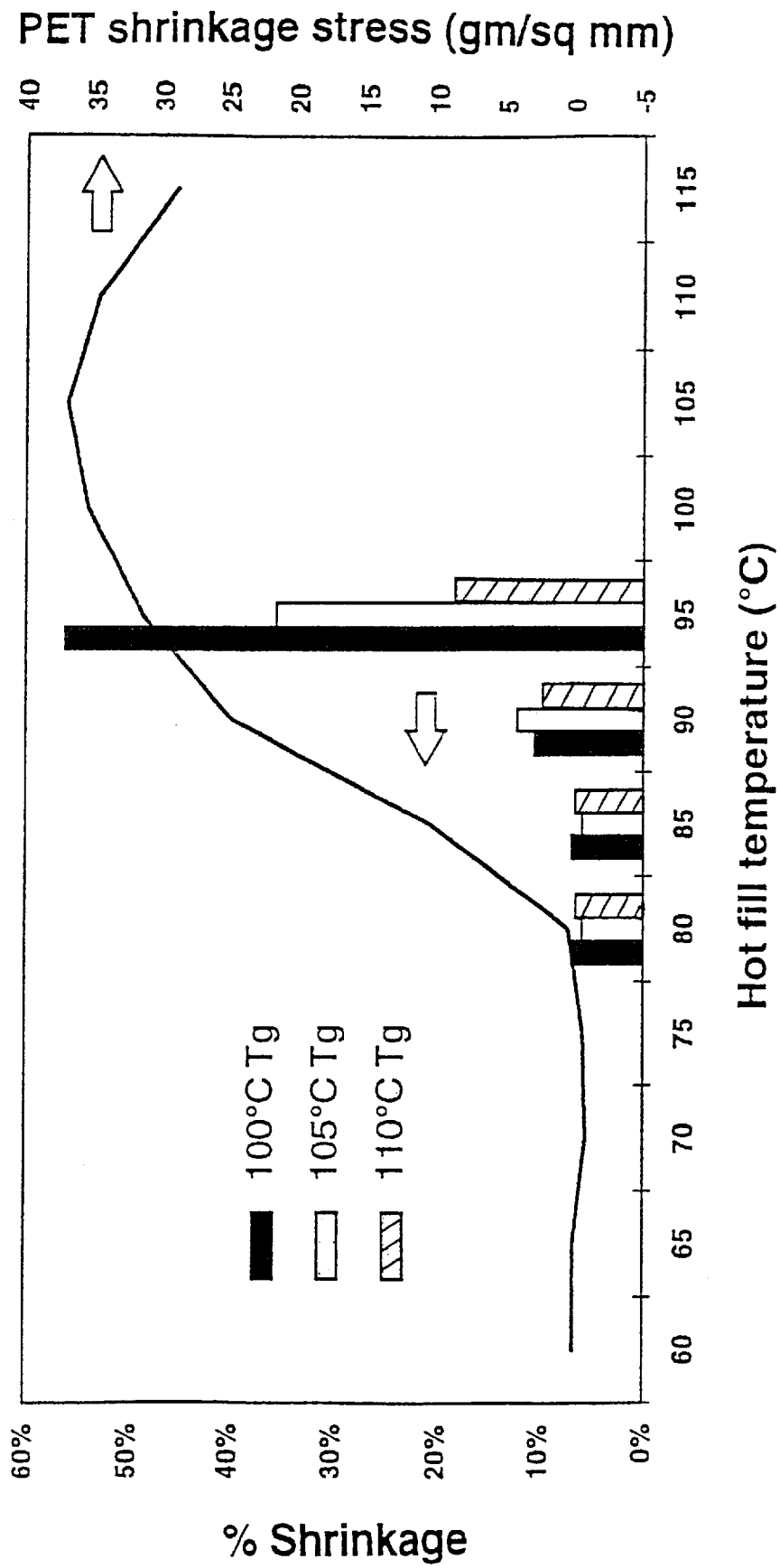
FIG. 1 is a plot of the relationship between volume percent shrinkage of a thermoformed container of the invention and the shrinkage stress in the low $T_g$ layer.

A multi-layer structure comprising layers having properties of transparency, low- or no- haze, and/or high strength and a method of forming that multi-layer structure in accordance with the present invention comprise forming at least one low $T_g$ layer comprising a first thermoplastic polyester, the first thermoplastic polyester comprising at least one crystallization rate inhibitor, and forming a high $T_g$ layer having a $T_g$ greater than the $T_g$ of the first layer, the high $T_g$ layer comprising a thermoplastic material. The multi-layer structure of the invention may be embodied in a variety of structural forms, for example, it may be produced as a flat or tubular or other conventionally shaped multi-layer laminate and it also may subsequently be formed or shaped into multi-layer laminates having any shape used in the packaging and container industry or any other shape within the forming and/or shaping capability of the multi-layer laminate material. In particular, the multi-layer structure of the invention may be a thermoformed container, a preform for forming a container, or a container such as a jar or bottle. The total amount of crystallization rate inhibitor in the at least one low $T_g$ layer is effective to prevent substantial haze in the low $T_g$ layer when the high $T_g$ layer is heated to a temperature above its $T_g$ during processing of the laminate by stretching, shaping or forming or other means. The processed multi-layer laminate does not substantially distort or deform upon heating to a temperature above the $T_g$ of the first layer.

In embodiments of the invention, the total amount of crystallization rate inhibitor also does not prevent attaining an effective amount of strain induced crystallization in the low $T_g$ layer or layers when the laminate is stretched. If the total amount of crystallization rate inhibitor in the low $T_g$ layer is insufficient, haze in the low $T_g$ layer will not be prevented when the multi-layer structure is heated to the appropriate processing temperature, for example, in a uniaxial or biaxial film orientation machine, a thermoformer or a blow molding machine. If the total amount of crystallization rate inhibitor in a low $T_g$ layer is too great, strain induced crystallization will be inhibited when the structure is stretched. The strain induced crystallization will be inhibited to the extent that an effective amount of strain induced crystallization and/or strength will not be attained in the low $T_g$ layer or layers. If insufficient strain induced crystallization and/or strength is present in the low $T_g$ layer or layers after the multi-layer laminate is stretched, such as in a blow molding process, all of the desired properties of the multi-layer laminate of the invention may not be achieved. For example, in a blow molding process, a structure with an insufficient amount of strain induced crystallization in the low $T_g$ layer or layers will have less resistance to deformation, distortion and/or shrinkage when it is used in a high temperature application such as a hot filling process, a pasteurization or a sterilization process.

The multi-layer structures of the invention will satisfy various functional end use requirements, depending on the particular high $T_g$ thermoplastic and/or low $T_g$ thermoplastic polyester material selected. Other layers may be added to serve additional functional end use requirements. In many instances, the high $T_g$ thermoplastic material is selected to improve the performance of the packaging or container material over that provided by the low $T_g$ thermoplastic polyester alone, which as described above is often unacceptable in more demanding applications, for example, those requiring barrier properties, hot-fill or other applications requiring heat resistance, and aseptic applications. High performance, high $T_g$ resins currently available with properties suitable to meet these more demanding applications are, for example, liquid crystalline polymer (LCP) resins and polyethylene naphthalate (PEN) resins. Because these resins are far more expensive than bulk thermoplastic polyesters such as PET, in embodiments of the invention layers containing these or other high cost, high performance resins are preferably as thin as possible in order to obtain the benefit of the high performance resin in the laminate product while remaining cost efficient.

The high $T_g$ thermoplastic material of the invention may be any thermoplastic material having a $T_g$ such that the $T_g$ of the high $T_g$ layer is greater than the $T_g$ of any of the low $T_g$ layers, and further, in other embodiments of the invention such that the $T_g$ of the high $T_g$ layer is at least about 85° C. If the multi-layer structure will be required to withstand, for example, a hot filling temperature, then the $T_g$ of the high $T_g$ thermoplastic material of the invention may be any thermoplastic material having a $T_g$ such that the $T_g$ of the high $T_g$ layer is greater than the temperature that the multi-layer structure will be required to withstand, such as a hot-fill, retort or pasteurization temperature. For example, for a hot-fill temperature of about 85° C., the $T_g$ of the high $T_g$ layer is at least about 85° C. In preferred embodiments of the invention, the $T_g$ of the high $T_g$ layer is at least about 10° C. to about 15° C. greater than the temperature that the multi-layer structure will be required to withstand, such as a hot-fill, retort or pasteurization temperature. That is, for a hot-fill temperature of about 85° C., the $T_g$ of the high $T_g$ layer is preferably at least about 95 –100° C.

Generally, the high $T_g$ thermoplastic material of the invention may be selected from the group consisting of liquid crystalline polymers, polyacrylates, polyacrylonitriles, polyarylates, polycarbonates, polystyrenes, high $T_g$ thermoplastic polyesters including liquid crystalline polyesters and polyethylene naphthalate, blends of polyethylene terephthalate and polyethylene naphthalate, copolymers of polyethylene terephthalate and polyethylene naphthalate, blends of one or more of these high $T_g$ thermoplastic materials, and copolymers of one or more of these high $T_g$ thermoplastic materials.

In embodiments of the invention, the multilayer laminates may comprise a high $T_g$ layer comprising a wholly aromatic, amorphous, stretchable liquid crystalline polymer. The liquid crystalline polymer is stretchable at a temperature below a molten state of the liquid crystalline polymer. The high $T_g$ layer has a $T_g$ of at least about 85° C. and is greater than the $T_g$ of the at least one low $T_g$ layer. The multilayer laminates comprise at least one low $T_g$ layer comprising a thermoplastic non-liquid crystalline polyester, the thermoplastic non-liquid crystalline polyester comprising at least one crystallization rate inhibitor. The total amount of crystallization rate inhibitor is effective to prevent substantial haze in the low $T_g$ layer upon heating the high $T_g$ layer to a processing temperature above the $T_g$ of the high $T_g$ layer and stretching the laminate at the processing temperature. The at least one low $T_g$ layer, after heating and stretching, remains substantially transparent.

Generally, thermotropic liquid crystalline polymers ("LCPs") have properties that are very desirable, such as excellent chemical resistance, high mechanical strength, and excellent gas, moisture and aroma barrier properties and LCP materials are selected when such properties are desirable in the laminate. High $T_g$ thermotropic liquid crystalline polymers are liquid crystalline (i.e., anisotropic) in the melt phase. Other terms, such as "liquid crystal", "liquid crystalline" and "anisotropic" have been used to describe such polymers. The stretchable liquid crystalline polymers suitable as a high $T_g$ thermoplastic are described in the aforementioned co-pending U.S. patent applications 08/954,379 and 08/955,000, the disclosures of which are incorporated herein by reference in their entirety. In embodiments of the invention, the liquid crystalline polymer layer and laminates prepared from the liquid crystalline polymer layer are stretchable at temperatures below a molten state of the liquid crystalline polymer.

The stretchable liquid crystalline polymer used in the multi-layer laminates of the invention is obtained from the liquid crystalline polymer described below. The LCP layer is stretchable at temperatures below its molten state without the need for adding substantial amounts of non-LCP thermoplastic polymers, filler or additives. However, there may be added amounts of non-LCP thermoplastic polymers, fillers or additives without adversely affecting the barrier or stretchability properties of either the LCP layer or the laminate of the invention. Exemplary amounts are up to about 10 mol percent total of added non-LCP thermoplastic polymers, fillers or additives, with the LCP comprising at least about 90 mol percent of the LCP layer. In other embodiments of the invention, the liquid crystalline polymer layer consists essentially of the liquid crystalline polymer. The stretchable liquid crystalline polymer used in the multi-layer laminates of the invention is wholly aromatic in that each of the monomeric units that the liquid crystalline polymer is derived from are monomers which have no aliphatic components, as described further below. The stretchable liquid crystalline polymer used in the multi-layer laminates of the invention is amorphous in that it exhibits a glass transition temperature ($T_g$) but displays no melting point transition ($T_m$) under differential scanning calorimetry (DSC) analysis.

The liquid crystalline polymers used in the multilayer articles described herein are wholly aromatic polymers, with relatively linear structures, which exhibit liquid crystalline behavior in the molten phase and include but are not limited to wholly aromatic amorphous polyesters or wholly aromatic amorphous polyester amides.

In embodiments of the invention, the liquid crystalline polymers of the present invention preferably comprise repeat units which as described in U.S. Pat. No. 5,672,296, incorporated herein by reference in its entirety, and correspond to the general formula:

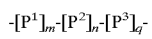

wherein $P^1$, $P^2$ and $P^3$ represent residues of monomeric moieties; $P^1$ is an aromatic hydroxy monocarboxylic acid; $P^2$ is aromatic dicarboxylic acid; $P^3$ is a phenolic compound; m, n and q represent mole percent of the respective monomers ranging generally from 5 to 70 percent individually. The preferred range of m is about 5 to 40 percent, n is about 5 to 40 percent and q is about 5 to 40 percent. In addition to $P^1$, $P^2$ and $P^3$, additional monomeric moieties such as, for example, a second aromatic hydroxy carboxylic acid moiety or an aromatic amino carboxylic acid moiety -[$P^4$]$_r$- and a diphenol moiety -[$P^5$]$_s$, may be part of the polymer repeat unit, in which case r is about 5 to 20 mole percent, and s is about 5 to 20 mole percent. $P^4$ is different from $P^1$ and $P^5$ is different from $P^3$. Still additional monomers may also be present such as, for example, phenyl hydroquinone, methyl hydroquinone and the like. In the above general formula, the monomers $P^1$ and $P^4$ are selected from the group consisting of 4-hydroxybenzoic acid, 2-hydroxy-6-naphthoic acid, 4-aminobenzoic acid, and 4-carboxy4'-hydroxy-1,1'-biphenyl. 4-Hydroxybenzoic acid is preferred. $P^2$ may be terephthalic acid, isophthalic acid, phthalic acid, 2-phenylterephthalic acid, 1,2-naphthalene dicarboxylic acid, 1,4-naphthalene dicarboxylic acid 2-6-naphthalene dicarboxylic acid and 4,4'-biphenyldicarboxylic acid; terephthalic acid is preferred. $P^3$ is selected from the group consisting of resorcinol, hydroquinone, methyl hydroquinone, phenyl hydroquinone, catechol, 4,4'-dihydroxybiphenyl and acetaminophen; 4,4'-dihydroxybiphenyl is preferred. $P^5$ is a diphenol and/or aminophenol selected from resorcinol, hydroquinone, catechol, 4,4'dihydroxybiphenyl, bisphenol-A and acetaminophen.

In preferred embodiments of the invention, the liquid crystalline polymer more preferably comprises a wholly aromatic thermotropic liquid crystal polyester which comprises the following the following five monomeric units; 4-hydroxybenzoic acid, 6-hydroxy-2-naphthoic acid, terephthalic acid, 4,4'-dihydroxybiphenyl and resorcinol, in a molar ratio 30:30:20:10:10 respectively (referred to as COTBPR hereafter). COTBPR is disclosed in U.S. Pat. No. 5,656,714 to Shen, et al. incorporated herein by reference in its entirety. Although particularly preferred, COTBPR is only one of many various wholly aromatic, amorphous, stretchable liquid crystalline polyester compositions disclosed therein which may be suitable in the practice of this invention. Shen, et al. also discloses semi-crystalline wholly aromatic liquid crystalline compositions which are not suitable in the practice of this invention. Examples of both amorphous and semi-crystalline compositions are listed in Table 1 of the aforementioned U.S. Pat. No. 5,656,714.

The liquid crystalline polymer compositions suitable for use in the multi-layer laminates of the present invention have a temperature range in which they can be described as being in a molten state, that temperature range being from about 200° C. to about 320° C., or more preferably from about 220° C. to about 300° C. The liquid crystalline polymer compositions of the present invention may be stretched not only in the molten state, but quite unexpectedly have the ability to be stretched at temperatures below the molten state and above the $T_g$ of the liquid crystalline polymer composition. In the present invention, the liquid crystalline polymer compositions are stretchable to total area draw ratios of at least about 10, more preferably at least about 15, without the appearance of any fractures or tears in any layer of the laminate.

In embodiments of the invention, the multilayer laminates may comprise a high $T_g$ layer comprising polyethylene naphthalate and at least one low $T_g$ layer comprising a thermoplastic polyester, the thermoplastic polyester comprising at least one crystallization rate inhibitor. The naphthalene dicarboxylic acid molecule (NDA) has a double aromatic ring, which, in comparison to the single aromatic ring of PET, results in a more rigid polymer backbone in the PEN. This results in increased strength, high thermal stability, and good barrier properties. PEN copolymers and blends may be selected when such properties are desirable in the laminate. In preferred embodiments of the invention, the high $T_g$ thermoplastic material is selected from the group consisting of blends and copolymers of polyethylene terephthalate and polyethylene naphthalate having from about 30 mole percent to about 100 mole percent polyethylene naphthalate. For these blends or copolymers of polyethylene terephthalate and polyethylene naphthalate the $T_g$ is a function of the composition of the blend or copolymer. For example, the relationship between the $T_g$ of the heat resistant material and the amount of polyethylene naphthalate can be established either experimentally or empirically and plotted on a graph. In the instance where heat resistance is the reason a polymer containing PEN has been selected, for example a high $T_g$ layer with a $T_g$ of at least about 85° C., the amount of each resin required in the blend or copolymer can be read from the graph and the composition can be produced.

Polyethylene naphthalate homopolymer is a relatively high $T_g$ material (about 123° C.), and polyethylene terephthalate homopolymer is a relatively low $T_g$ material (about 70° C.), and as the polyethylene naphthalate content in the blend or copolymer increases, the $T_g$ increases.

Copolymers of PEN and PET do not crystallize within in a range having 15–20% by weight PEN as a lower limit and 80–85% weight percent of PEN as an upper limit, they are amorphous in that range. It has also been reported in U.S. Pat. No. 5,628,957 to Collette, et al. that blends of PEN and PET as a high $T_g$ layer in a multi-layer bottle are substantially non-crystallizable and amorphous in the 20–80 weight % PEN range.

However, the inventors have unexpectedly found that a heat resistant multi-layer bottle can be produced with very low amounts of high cost PEN resin by making the high $T_g$ layer strain-crystallized, even in the 20–80% PEN range. High crystallinity relates to higher strength for a high $T_g$ PEN layer in this weight percent range and therefore the high $T_g$ layer has a higher strength per unit of PEN used, and less PEN resin can be used to prepare a high strength, strain crystallizable high $T_g$ layer. The advantage of this embodiment of the multi-layer laminate of the invention is evident because the high $T_g$ PEN layer can be made thinner, and also strain-crystallized high $T_g$ layers can also be attained at much lower levels of PEN, for example 60%, as opposed to the 90% PEN strain crystallized layers that have been proposed by others. Furthermore, the processing temperature, relative to that required for 90% PEN/PET, is lower when using a 60% PEN/PET strain crystallizable blend, which is also beneficial. Therefore, even though it is not deleterious to use an amorphous PEN high $T_g$ layer, the benefits of optimizing strength and heat resistance with a minimum of PEN material are fully attained by use of a strain crystallized blend of PEN and PET in accordance with the invention.

A heat resistant, strain crystallizable polyester resin blend comprising from about 20 to about 80 mole percent naphthalene dicarboxylic acid (NDA) may be obtained by blending a PEN containing copolymer resin comprising from about 20 weight percent to about 95 weight percent NDA, with a PET resin in appropriate quantities to obtain the desired mole percent PEN in the strain crystallizable blend. Commercially available PEN containing resins having on the order of 80 to 95 weight percent PEN are preferred as a starting material. The resins are combined in a dry blending apparatus at a temperature in the range of 140° C. to 180° C., preferably 150° C. to 170° C. The blending time is from about 4 hours to about 8 hours, preferably from about 5 to 7 hours, under a vacuum of 27 to 30 mm Hg, preferably about 28–29 mm Hg.

The heat resistant, dry blended polyester resin may be extruded in a single stage, single screw extruder at a melt temperature in the range of 290° C. to 300° C. with an average residence time in the melt system of at least about 10 minutes, preferably about 15 to 25 minutes to obtain a single layer flat sheet of strain crystallizable heat resistant polyester having a thickness of from about 10 to about 40 mils exiting the die having a haze value of 10% or less, preferably 5% or less, more preferably 2% or less.

Another benefit of the blended, strain crystallizable PEN materials of the invention is that in the range of about 15–20 to about 80–85 weight percent polyethylene naphthalate, blends of polyethylene naphthalate and polyethylene terephthalate are preferred over copolymers because a high quality heat resistant resin is easier to obtain through blending as opposed to copolymerization. For blends of these materials, starting with polyethylene naphthalate (PEN) homopolymer results in non-homogeneous, hazy or opaque blends having poor clarity because PEN homopolymer/PET blends result in a non-homogeneous blend. For example, a copolymer comprising 90 weight percent polyethylene naphthalate and 10 weight percent terephthalic acid having a $T_g$ in the range of 120° C. to 125° C. is a good source of high $T_g$ material in the blending process because the terephthalic acid component of this copolymer acts as a compatibilizer and permits transesterification in the blending process with low $T_g$ homopolymers or copolymers having terephthalic acid as a major component.

In embodiments of the invention having a high $T_g$ layer comprising a PEN blend or copolymer, the functional end use requirement is to produce a heat resistant or heat stable container. One particular application for the heat resistant containers of the invention is in the packaging of food or beverage items which must be put into the container at elevated temperatures, for example, certain fruit juices, pickles or tomato sauces. At a typical hot filling temperature of 85° C., the glass transition temperature ($T_g$) of the heat resistant layer is selected to be substantially higher than the hot fill temperature. Thus, the heat resistant layer can resist the shrinkage stress in the low $T_g$ layer caused by heating the container to the hot filling temperature because the heat resistant layer is substantially above its softening point or $T_g$. Furthermore, if the high $T_g$ layer has had strain induced crystallinity imparted to it during processing, this adds further to its strength and rigidity and its ability to resist the shrinkage stress of the low $T_g$ layer. The low $T_g$ layer also adds mechanical strength to the container and resists shrinkage due to its strain induced crystallinity.

FIG. 1 is a plot of the relationship between volume percent shrinkage of containers and the PET shrinkage stress in the low $T_g$ layer for 2-layer thermoformed containers having different high $T_g$ layers and hot filled at different temperatures. The containers were formed from 2-layer sheet having a total thickness of 22 mils with a high $T_g$ layer thickness of 8 mils. Thermoformed cups made with heat resistant layers having $T_g$'s of 100° C., 105° C. and 110° C. were hot filled at temperatures of 80° C., 85° C., 90° C. and 95° C.

As shown in FIG. 1, at a hot filling temperature of 80° C., the PET shrinkage stress was minimal and the volume percent shrinkage was about 5% for all three containers with heat resistant layers having $T_g$'s of 100° C., 105° C. and 110° C.

At a hot filling temperature of 85° C., the PET shrinkage stress increased sharply to about 10 grams/mm², however, the volume percent shrinkage remained constant at about 5% for all three containers with heat resistant layers having $T_g$'s of 100° C., 105° and 110° C. At this hot filling temperature, the heat resistant layers in all three containers resisted the shrinkage forces in the low $T_g$ layer and showed no increase in volume percent shrinkage when compared to the containers hot filled at 80° C.

At a hot filling temperature of 90° C., the PET shrinkage stress increased to about 25 grams/mm², more than double the value for 85° C. The volume percent shrinkage almost doubled for all three containers with heat resistant layers having $T_g$'s of 100° C., 105° C. and 110° C. At this hot filling temperature, the heat resistant layers in all three containers did not fully resist the increased shrinkage forces in the low $T_g$ layer when compared to the containers hot filled at 85° C. However, the nearly uniform shrinkage values for the three different high $T_g$ layers suggest that the shrinkage was due more to increased shrinkage stress rather than softening of the high $T_g$ layers.

At a hot filling temperature of 95° C., the PET shrinkage stress increased to about 32 grams/mm². This was only about a 30% increase over the value for 90° C. However, the volume percent shrinkage doubled for the container with a heat resistant layer having a $T_g$ of 110° C., tripled for the container with a heat resistant layer having a $T_g$ of 105° C. and quadrupled for the container with a heat resistant layer having a $T_g$ of 100° C. At a hot filling temperature of 95° C., the heat resistant container with a heat resistant layer having a $T_g$ of 110° C. had very little resistance to the increased shrinkage forces in the low $T_g$ layer. At a hot filling temperature of 95° C., the heat resistant containers with a heat resistant layer having a $T_g$'s of 105° C. and 110° C. had virtually no resistance to the increased shrinkage forces in the low $T_g$ layer.

Thus, as the hot filling temperature approaches the $T_g$ of the heat resistant layer, the multi-layer structure loses its ability to resist shrinkage, especially when the heat resistant layer begins to soften.

In embodiments of the invention, the low $T_g$ layer has strain induced crystallization which enhances the heat resistance and strength of the both the low $T_g$ layer and the multi-layer structure. The higher the level of strain induced crystallization in the low $T_g$ layer, the more improvement in mechanical strength, rigidity and heat resistance is attained in that layer. The crystalline sites in the strain crystallized layer have polymer molecules that are ordered and densely packed, and this polymer layer resists shrinkage in the temperature range above the $T_g$ of the low temperature layer and below the melting point ($T_m$) because of this densely packed structure in the crystalline regions.

The functional requirements of the composition of the at least one low $T_g$ layer are that it is strain crystallizable, strain orientable and have excellent mechanical strength properties when the multi-layer structure comprising the high $T_g$ layer and the at least one low $T_g$ layer is heated and stretched. In preferred embodiments of the invention, the low $T_g$ layer is acceptable for food contact, for example, approved by the U.S. Food & Drug Administration or other governmental or regulatory agencies responsible for such an approval. The multi-layer structure remains haze free and transparent, and in embodiments of the invention the multi-layer structure may be thermoformed and/or stretch blow molded into high clarity, high strength formed articles.

The low $T_g$ layer or layers comprise a thermoplastic polyester and at least one crystallization rate inhibitor. In embodiments of the invention, the thermoplastic polyester is selected from the group consisting of polyethylene terephthalate, post consumer recycled polyester, and blends of polyethylene terephthalate and post consumer recycled polyester. Preferably, the thermoplastic polyester comprises polyethylene terephthalate. Other desirable properties of the thermoplastic polyester bulk resin are low cost and that it is processable in conventional equipment. The $T_g$ of the low $T_g$ layer is always less than the $T_g$ of the high $T_g$ layer, and in embodiments of the invention the $T_g$ of the low $T_g$ layer is less than about 85° C., less than about 80° C. or less than about 75° C.

The crystallization rate inhibitor is present in the low $T_g$ layer in an amount effective to prevent the formation of substantial haze in the at least one low $T_g$ layer when the high $T_g$ layer of the multi-layer structure is heated to a processing temperature above the $T_g$ of the high $T_g$ layer, preferably a processing temperature at least about 10° C. to about 15° C. above the $T_g$ of the high $T_g$ layer.

Processing temperature is the variable most heavily influencing what total amount of crystallization rate inhibitor must be present to be effective to prevent the formation of substantial haze in the low $T_g$ layer or layers. However, other variables contributing to the amount of heat energy added to the low $T_g$ layer and the amount of time that the low $T_g$ layer is exposed to the heat energy before stretching or forming the multi-layer laminate of the invention may also have an impact on the total amount of crystallization rate inhibitor necessary to prevent haze in the low $T_g$ layer or layers.

Using two-stage blow molding as an illustrative process, variables such as equipment and heater configuration; preform shape, size and thickness; high $T_g$ layer placement, thickness and processing characteristics; low $T_g$ layer(s) placement, thickness and processing characteristics; cycle time and heating rate may impact the determination of the effective amount of inhibitor. Thus, the minimum effective amount of inhibitor should be determined for a particular application. For example, for a high $T_g$ layer comprising on the order of 50% to 60% PEN and having a $T_g$ of about 100° C.–103° C., an appropriate processing temperature of at least about 10° C. to 15° C. above the $T_g$ of the PEN material, i.e. about 115° C., could be selected for stretch blow molding a preform. In this case, low $T_g$ layers having at least about 3.5% by weight of crystallization rate inhibitors under conditions where other variables do not contribute appreciably to the amount of heat energy in the low $T_g$ layer or the amount of time that the low $T_g$ layer is heated during processing would be effective to prevent the formation of substantial haze in the low $T_g$ layer. Otherwise, low $T_g$ layers having at least about 4.0% by weight of crystallization rate inhibitors under conditions where other variables do contribute appreciably to the amount of heat energy in the low $T_g$ layer or the amount of time that the low $T_g$ layer is heated during processing would be effective to prevent the formation of substantial haze in the low $T_g$ layer. Thus, it can be appreciated that the effective lower limit is established based on the particular characteristics of a given application. This lower limit may also be influenced by the effectiveness of the particular crystallization rate inhibitor, or combination of inhibitors, selected.

Generally, low $T_g$ layers having at least about 2.0% by weight of crystallization rate inhibitors, preferably at least about 4.0% by weight of crystallization rate inhibitors would be effective to prevent the formation of substantial haze in the low $T_g$ layer when forming multi-layer laminates of the invention with processing temperatures less than about 125° C.

However, there may be instances where the processing characteristics of the high $T_g$ material necessitates a substantially higher processing temperature, which in turn increases the total amount of crystallization rate inhibitor which must be present to be effective to prevent the formation of substantial haze in the low $T_g$ layer or layers. For example, when thermally processing the stretchable, wholly aromatic, amorphous LCPs discussed above, their high tensile modulus at temperatures above $T_g$ results in a resistance to stretching at the temperature that would typically be selected for a thermoplastic having a $T_g$ of 107° C., i.e. about 120° C. The stretchable LCPs suitable for the multi-layer laminates of the invention must be stretched hotter than other thermoplastic polyesters, so for these LCPs the processing temperature must be increased. The tensile modulus of COTBPR, measured at 130° C., is $3.8 \times 10^5$ psi in the machine direction and $5.3 \times 10^2$ psi in the transverse direction. The processing temperature for such an LCP is at least about 30° C. greater than the $T_g$ of the LCP, or high $T_g$, material. In this case, low $T_g$ layers having at least about 5.0% by weight, or in other embodiments of the invention, at least about 8.0% by weight of crystallization rate inhibitors under conditions where other variables do not contribute appreciably to the amount of heat energy in the low $T_g$ layer or the amount of time that the low $T_g$ layer is heated during processing would be effective to prevent the formation of substantial haze in the low $T_g$ layer. This lower limit may also be influenced by the effectiveness of the particular crystallization rate inhibitor, or combination of inhibitors, selected. Otherwise, low $T_g$ layers having at least about 10.0% by weight of crystallization rate inhibitors would be effective to prevent the formation of substantial haze in the low $T_g$ layer when forming multi-layer laminates of the invention with processing temperatures less than about 150° C. The crystallization rate inhibitor or inhibitors in the low $T_g$ layer may be selected from the group consisting of 1,2-, 1,3-, 1,4-, 1,5-, 1,6-, 1,7-, 1,8-, 2,3-, 2,4-, 2,5-, 2,6-, 2,7-, and 2,8-, isomers of naphthalene dicarboxylic acid or a derivative thereof, isophthalic acid or a derivative thereof, diphenyl-4,4' dicarboxylic acid or a derivative thereof, 4,4'-diphenyletherdicarboxylic acid or a derivative thereof, sebacic acid or a derivative thereof, decane-1,10-dicarboxylic acid or a derivative thereof, adipic acid or a derivative thereof, glutaric acid or a derivative thereof, fumaric acid or a derivative thereof, stilbenedicarboxylic acid or a derivative thereof, azelaic acid or a derivative thereof, biphenyldicarboxylic acid or a derivative thereof, cyclohexanedicarboxylic acid or a derivative thereof, cyclopropanedicarboxylic acid or a derivative thereof, propanediol or a derivative thereof, propylene glycol or a derivative thereof, trimethylene glycol or a derivative thereof, diethylene glycol or a derivative thereof, butanediol or a derivative thereof, tetramethylene glycol or a derivative thereof, pentamethylene glycol or a derivative thereof, hexanediol or a derivative thereof, hexamethylene glycol or a derivative thereof, decamethylene glycol or a derivative thereof, neopentylene glycol or a derivative thereof, cyclohexanediol or a derivative thereof, cyclohexanedimethanol or a derivative thereof.

As discussed above, different crystallization rate inhibitors have a varying rate of effectiveness in preventing the formation of haze, so the optimum amount of inhibitor to prevent haze may have to be determined empirically. The same may be true for the determination of an appropriate upper limit of inhibitor selected to not prevent attaining an effective amount of strain induced crystallinity in the low $T_g$ layer.

The appropriate amount of crystallization rate inhibitor or inhibitors in the low $T_g$ layer may be determined by differential scanning calorimetry. The at least one low $T_g$ layer in the multi-layer laminate has a cold crystallization temperature ($T_{cc}$) which can be measured by a differential scanning calorimeter. A sample of the low $T_g$ layer composition containing crystallization rate inhibitors is heated in a differential scanning calorimeter to a temperature higher than the melting point ($T_m$) for a period of time until any residual molecular polymer history, for example crystallinity and/or orientation, is removed from the polymer sample. At that point, the molten polymer sample becomes a completely amorphous melt. The completely amorphous melt is rapidly quenched to solidify it without allowing sufficient time for any crystalline growth. Then, the differential scanning calorimeter is set at a heating rate of 10° C. per minute and temperature at which the crystallization occurs (peak) is measured. This is the cold crystallization temperature ($T_{cc}$). The appropriate total amount of crystallization rate inhibitor can be related to the difference between $T_{cc}$ and the $T_g$ of the high $T_g$ material. In embodiments of the invention where the high $T_g$ material has a tensile modulus above its $T_g$ much greater than that of the low $T_g$ layer, such as the stretchable LCPs discussed above, the difference between $T_{cc}$ and the $T_g$ of the high $T_g$ material should be about 40° c. In embodiments of the invention where the high $T_g$ material has a tensile modulus above its $T_g$ relatively similar to that of the low $T_g$ layer, such as the PEN copolymers and blends discussed above, the difference between $T_{cc}$ and the $T_g$ of the high $T_g$ material should be about 20° C., more preferably about 25° C. The value of $T_{cc}$ for various modified PET resins is shown below in Table A.

TABLE A

COLD CRYSTALLIZATION TEMPERATURE ($T_{cc}$) OF VARIOUS MODIFIED PET RESINS

| Resin | $T_{cc}$ (° C.) | Total CRI (wt %) | IPA (wt %) | NDA (wt %) | DEG (wt %) |
|---|---|---|---|---|---|
| 1 | 134 | 2.9 | 2.4 | | 0.5 |
| 2 | 134 | 2.9 | 1.5 | | 1.4 |
| 3 | 134 | 3.8 | 2.4 | | 1.4 |
| 4 | 143 | 5.0 | 4.5 | | 0.5 |
| 5 | 141 | 6.3 | 5.5 | | 0.8 |
| 6 | 142 | 8.5 | 7.8 | | 0.7 |
| 7 | 150 | 10.5 | 10.0 | | 0.5 |
| 8 | 156 | 10.8 | | 10 | 0.8 |

CRI = Crystallization Rate Inhibitors
IPA = Isophthalic Acid
NDA = Naphthalene Dicarboxylic Acid
DEG = Diethylene Glycol With respect to an upper limit on the total amount of crystallization rate inhibitors used in the low $T_g$ layer or layers to prevent haze, the upper limit is necessary to prevent the situation where the total amount of crystallization rate inhibitors used in the low $T_g$ layer is such that the inhibitors prevent the development of strain induced crystallinity in the low $T_g$ layer or layers during shaping, stretching and/or forming of the multi-layer laminate of the invention. A reduction in the amount of strain induced crystallinity reduces the strength and stiffness of the low $T_g$ layer or layers of the multi-layer laminate of the invention. Consequently, to compensate for the loss of strength, either the high $T_g$ layer, or the low $T_g$ layer, or both, must be increased in thickness, raising the cost of the product. In general, the upper limit is no more than about 15 weight percent of total crystallization rate inhibitors. In embodiments of the invention, the total amount of crystallization rate inhibitor in the low $T_g$ layer or layers can be range from the minimum amount effective to prevent the development of substantial haze to an amount about 5 weight percent greater than that amount. Thus, for the case where about 4% by weight of crystallization rate inhibitors is effective to prevent substantial haze in a multi-layer laminate of the invention having a PEN blend as the high $T_g$ layer, the upper limit is preferably about 9%. For the case where about 10% by weight of crystallization rate inhibitors is effective to prevent substantial haze in a multi-layer laminate of the invention having a PEN blend as the high $T_g$ layer, the upper limit is preferably about 15%. In the event a low $T_g$ layer having about 15% by weight of crystallization rate inhibitors is used to prevent haze in a multi-layer laminate of the invention, for example, in an application where the processing temperature is high in order to stretch a laminate with a relatively thick LCP layer and/or wherein and other process variables contribute to the tendency of the low $T_g$ layer to develop haze, the amount of inhibitors may reduce the ability of the low $T_g$ layer to strain crystallize. In this instance the amount of strength and crystallinity desired in the low $T_g$ layer or layers is balanced against the need to have substantially no or low haze in the low $T_g$ layer(s). Alternately, if the need for strength is more important in the particular application, the amount of inhibitors may be reduced in order to develop more strength in the low $T_g$ layers of the laminate while permitting a slight amount of haze in the low $T_g$ layers.

In embodiments of the invention, the strain crystallized high $T_g$ layer has a tensile strength, after stretching and attaining strain crystallization of at least about 10%, preferably at least about 15%, of at least about 25,000 psi, preferably at least about 35,000 psi. Also, the strain crystallized low $T_g$ layer has a tensile strength, after stretching and attaining strain crystallization of at least about 15%, preferably at least about 20%, of at least about 20,000 psi, preferably at least about 30,000 psi. The stretched laminate has excellent strength properties due to the individual contributions of each of the layers, the high $T_g$ layer and the low $T_g$ layer.

The crystallization rate inhibitors may affect the $T_g$ of the low $T_g$ layer in different ways. The crystallization rate inhibitors may shift the $T_g$ of the low $T_g$ layer to a higher value than would be obtained without the addition of the total amount of crystallization rate inhibitor to the low $T_g$ layer, a lower value than would be obtained without the addition of the total amount of crystallization rate inhibitor to the first layer, or there may be no change in the $T_g$ of the low $T_g$ layer due to the addition of at least one crystallization rate inhibitor.

For example, in embodiments of the invention, naphthalene dicarboxylic acid or a derivative thereof will shift the $T_g$ of the low $T_g$ layer to a higher value than would be obtained without the addition of the total amount of crystallization rate inhibitor to the low $T_g$ layer. Isophthalic acid or a derivative thereof and diethylene glycol or a derivative thereof will shift the $T_g$ of the low $T_g$ layer to a lower value than would be obtained without the addition of the total amount of crystallization rate inhibitor to the low $T_g$ layer. Adding a crystallization rate inhibitor that raises $T_g$ and also one that lowers $T_g$ may result in no change in the $T_g$ of the low $T_g$ layer. Using cyclohexane dimethanol as a crystallization rate inhibitor may result in no change in the $T_g$ of the low $T_g$ layer.

The crystallization rate inhibitors may be blends of polyesters containing the appropriate amount of inhibitors, but preferably they are copolymers containing the appropriate amount of crystallization rate inhibitors. The reason that copolymers are preferred relates to the performance of blended low $T_g$ resins formed from two or more resins. In such a mixture of resins the majority component influences and governs the properties of the mixture. This is possibly because, on a micro scale, the polymer has separate regions of the individual resins used to form the blend. If the performance of these blended polymers is improved by increasing the degree of blending and transesterification, the resistance to crystallization of the blends ultimately approaches that of a copolymer of the same composition.

The benefits of the multi-layer structure of the invention are realized by the combination of the high $T_g$ layer and at least one low $T_g$ layer. There is an economic advantage to the multi-layer structures of the invention because they employ a minimal amount of the high $T_g$ resin as a thin layer, yet the multi-layer structures attain comparable properties, such as barrier, heat resistance, etc., to a structure consisting of the high $T_g$ resin, while employing, in the multi-layer structure, only a small amount of that resin. The low $T_g$ resins are generally much lower in cost than the high $T_g$ resins. The combination of the thin high $T_g$ layer together with at least one low $T_g$ layer and their interaction result in low cost product having a high utility.

For example, the multi-layer structure of the invention may be the combination of an LCP layer and at least one low $T_g$ layer. In this embodiment of the multi-layer structure of the invention, the exceptional barrier properties of the LCP layer are combined with the low or no-haze, high crystallinity, and high strength of the low $T_g$ layer. An economical high barrier, transparent laminate is obtained by combining a relatively thin layer of high cost stretchable LCP material with a thicker layer of low cost crystallization inhibitor modified bulk polyester resin.

In other embodiments, the multi-layer structure of the invention may be the combination of a heat resistant layer and at least one low $T_g$ layer. In this embodiment of the multi-layer structure of the invention, the exceptional heat resistance properties of the high $T_g$ layer are combined with the low or no-haze, high crystallinity, and high strength of the low $T_g$ layer. An economical heat resistant, transparent laminate is obtained by combining a relatively thin layer of high cost heat resistant material with a thicker layer of low cost crystallization inhibitor modified bulk polyester resin.

In embodiments of the invention the ratio of the thickness of the high $T_g$ layer to the sum of the thickness of each low $T_g$ layer depends upon the functionality of the high $T_g$ layer. For embodiments comprising a layer of stretchable LCP the ratio of the thickness of the high $T_g$ layer to the sum of the thickness of each low $T_g$ layer is from about 1:200 to about 1:3. The preferred range depends upon the primary objective of the multi-layer laminate of the invention. If economics are the primary objective, a 0.005 inch thick (0.5 mil) layer of stretchable LCP will be used with 100 mils or more of low $T_g$ material to form an extremely low cost container having excellent barrier and transparency. If the application demands higher barrier properties, the ratio of LCP to low $T_g$ material is increased. The flexibility of adapting to varied barrier specifications is an advantage of the multi-layer laminate of the invention. The LCP layer may be as thick as 25 to 30 mils thick before stretching, if necessary. When the LCP layer is stretched in the multi-layer laminate, it may be reduced in thickness, for example in the sidewall section of a blow molded bottle, to as thin as 0.05 mil.

For embodiments comprising a layer of heat resistant material such as a strain crystallizable PEN blend or copolymer, the ratio of the thickness of the high $T_g$ layer to the sum of the thickness of each low $T_g$ layer is about 1:20 to about 1:3, preferably from about 1:15 to about 1:5 in the container wall of the heat resistant product. The heat resistant, high $T_g$ layer may be as thick as 25 to 30 mils thick before stretching, if necessary. The heat resistant, high $T_g$ layer may be as thin as 10 mils thick before stretching. When the heat resistant, high $T_g$ layer is stretched in the multi-layer laminate, it may be reduced in thickness, for example in the sidewall section of a blow molded bottle, to as thin as about lo 1.0 to 2.0 mil. It is an advantage of the invention that a high $T_g$ layer of as low as 1.0 mil to about 3 mils of thickness provides a heat resistant container with a minimal amount of PEN or other high cost, heat resistant high $T_g$ material. In embodiments of the invention, the multi-layer laminate has a single, thin heat resistant high $T_g$ layer and the thickness of the thin high $T_g$ layer is less than about 25% of the total thickness of the multi-layer laminate, more preferably 10% or less of the total thickness of the laminate. For example, a hot fillable container may be produced having a total sidewall thickness on the order of about 12 to 15 mils, with the heat resistant high $T_g$ layer having a thickness of about 1.25 to 1.5 mils, or about 10%, of the total thickness. This is an exceptionally cost effective way to produce heat resistant containers having a minimal amount of high cost, high $T_g$ material.

There are several other advantages to having a thinner heat resistant layer besides lower material cost; (1) less heating is required to reach the processing temperature resulting in lower energy cost, (2) the low $T_g$ layer is exposed to process heat for a shorter time and is less likely to haze and (3) the thinner the heat resistant layer is the less resistance it presents to the forces that cause strain induced crystallization during stretching. A thicker heat resistant layer reduces the force applied to the low $T_g$ layer, resulting in reduced stretch induced crystallization of the outer layer. This in turn causes a lowering of the strength and an increase in the shrinkage stress of the low $T_g$ layer when heat is applied. However, the heat resistant layer may not be too thin or it will not provide resistance to the shrinkage forces of low $T_g$ layer when a multi-layer structure of the invention is hot-filled or otherwise exposed to heat.

Another advantage to the thin high $T_g$ layer of the multi-layer laminate of the invention is that it acts as a processing aid and during the heating and stretching of laminate and the at least one low $T_g$ layer is uniformly distributed, resulting in a stretched laminate having a highly uniform thickness distribution. Having a highly uniform thickness distribution is an extremely important aspect of the multi-layer laminate of the invention, as the products perform only as well as their thinnest portion, i.e. the weakest link. For example, the thickness of the stretched laminate, and accordingly the barrier properties and/or resistance to distortion, must be uniform throughout the container, or the poor barrier or distortion occurring at that thin section of the container will result in an unacceptable product. In embodiments of the invention, the multi-layer laminate is heated and stretched into a bottle having a sidewall portion, and the standard deviation of the sidewall portion thickness is 0.07 mm or less, preferably the standard deviation of the sidewall portion thickness is 0.05 mm or less.

Furthermore, the combination of a thin high $T_g$ layer and uniform material distribution, together with strain induced crystallinity in all the high and low $T_g$ layers of the laminate, results in a high performance, low cost container which may be manufactured using a minimal amount of high cost materials. For example, in embodiments of the invention disclosed in the Examples, the multi-layer laminate is a polyester bottle having less than about 15% weight percent, preferably less than about 10% weight percent, naphthalene dicarboxylic acid as carboxylic acid units and the bottle has an 85° C. hot-fill shrinkage value of less than about 3.5 volume per cent. No other heat resistant material is used other than the naphthalene dicarboxylic acid, which is only present in the high $T_g$ layer. The other repeating carboxylic acid units in the polymers are terephthalic acid or isophthalic acid. In further embodiments of the invention disclosed in the Examples, the multi-layer laminate is a polyester bottle having less than about 20% weight percent, preferably less than about 15% weight percent, naphthalene dicarboxylic acid as carboxylic acid units and the bottle has an 85° C. hot-fill shrinkage value of less than about 2.0 volume per cent. No other heat resistant material is used other than the naphthalene dicarboxylic acid, which is present in the high $T_g$ layer for heat resistance and in the low $T_g$ layer as a crystallization rate inhibitor. The other repeating carboxylic acid units in the polymers are terephthalic acid and isophthalic acid.

The stretched thickness of heat resistant layer varies in different parts of the stretched container. For example, in a stretch blow molded bottle, the side walls are thinner than the shoulder area or bottom area.

Processes of forming the multi-layer laminate of the invention may be any suitable means for combining two or more layers of thermoplastic polymer to form a laminate. Three general categories of laminate forming methods are exemplary, but not exhaustive, of possible methods of laminate formation. The first category is combining two polymer layers before they solidify, i.e., when they are both in the molten state. Extrusion methods such as feedblock coextrusion or multi-manifold coextrusion are examples of such a method and are both acceptable ways of forming the laminate according to the invention. Another category is combining an unsolidified, i.e, molten polymer layer with a solidified polymer layer. Processes such as extrusion coating and extrusion lamination are in this category and are suitable for forming the laminates of the invention. Combining solidified layers is the third general laminate forming category and lamination and certain coating processes are suitable for forming the laminate of the invention in this manner.

In an exemplary process, a high $T_g$ layer and a low $T_g$ polyester layer are coextruded simultaneously in a conventional coextrusion process using a feedblock to combine the polymer streams right at the die exit. The polymer streams join together while they are still above the melting point, resulting in a multilayer film exiting to die. The multilayer laminates of the present invention may also be extruded in planar, tubular, or other configurations. Also, a tubular laminate may be coextruded and slit or otherwise opened to form a planar coextrudate. The multilayer laminates of the present invention may be stretched during extrusion, subsequent to extrusion, or both during and subsequent to extrusion. The tubular multilayer laminate may also be formed from the multilayer laminates of the present invention by spiral winding. Other suitable processes such as, for example, compression or injection molding, may also be used to produce the laminates of the present invention including films, sheets, preforms, parisons and other articles.

The multi-layer structures may be formed into articles by suitable methods. The multilayer laminates of the invention possess properties ideally suited for thermoforming, blow molding and other methods of mass producing shaped articles with the use of heat and stretching. Such processes are well known to those skilled in the art. The various techniques by which film or sheet may be formed into useful articles are described in such works as James L. Throne, "Thermoforming," (Hanser Publishers, New York, 1987)

which is incorporated herein by reference. Similarly, if the laminates are coextruded in the form of a tube or parison, then these are ideally suited for blow molding. The various blow molding techniques, such as extrusion blow molding. The various blow molding techniques, such as extrusion blow molding, injection blow molding, stretch blow molding, and the like, are described, for example, in Donald V. Rosato and Dominick V. Rosato, editors, "Blow Molding Handbook," (Hanser Publishers, 1988) which is incorporated herein by reference. Such parisons suitable for various blow molding processes can also be produced by injection-molding or co-injection molding as is well-known to those skilled in the art. In addition, a container can be formed by a combination of these processes, for example, extruding a multi-layer parison containing a high $T_g$ layer and a low $T_g$ layer, extrusion-blow-molding this parison to form a shaped insert, injection molding another low $T_g$ layer of polyester, such as polyethylene terephthalate modified with at least one crystallization rate inhibitor around the outside of this insert to form a preform, and finally stretch-blow molding the preform to form a bottle, jar or other container. Alternatively, the multi-layer insert can be produced by thermo-forming a planar sheet. These insert-molding processes are generally described for use with materials other than those of the multi-layer laminate of the invention, for example, in U.S. Pat. No. 5,443,766 to Slat, et al. and U.S. Pat. No. 5,464,106 to Slat, et al., the disclosures of which are hereby incorporated by reference in their entireties. Such stretch-blown containers are useful for a variety of packaging applications such as for foods, beverages, cosmetics, chemicals and industrial products.

In embodiments of the invention, an injection molded low $T_g$ outer layer of thermoplastic material may include post consumer recycled polymer. Many configurations of multi-layer preforms may be formed in this manner, depending on the number of layers and their configuration in the extruded laminate. For example, a thermoformed insert having a single layer of high $T_g$ material will form a preform having an extruded, thermoformed, heat resistant inner layer and an injected polyester outer layer.

In embodiments of the invention, the flat multi-layer laminate may be thermoformed to form a container. Also, in embodiments of the invention, a multi-layer preform for blow molding a high transparency article may be produced. The method may comprise the steps of forming a low $T_g$ layer having an inner surface, an outer surface, an open end and an opposite end and comprising a low $T_g$ thermoplastic polyester and at least one crystallization rate inhibitor. A high $T_g$ layer is also formed comprising a thermoplastic material and having a $T_g$ greater than the $T_g$ of the first layer and having an inner surface, an outer surface, an open end and an opposite end. In embodiments of the invention, the total amount of crystallization rate inhibitor in the first layer of the preform is effective to prevent substantial haze in the first layer upon heating the multi-layer preform in a blow molding process to a processing temperature greater than the $T_g$ of the high $T_g$ layer, preferably at least about 10° C. to 15° C. greater than the $T_g$ of the high $T_g$ layer. The layers may be formed before or after each other or at the same time. The inner surface of either the high or low $T_g$ layers is in contact with the outer surface of the other layer and the open ends and closed ends of both layers are coincident.

In embodiments of the invention the method of forming the multi-layer preform further comprises the step of forming closed ends on the high $T_g$ layer and the low $T_g$ layer opposite their open ends. For example, in a method wherein the multi-layer structure is formed by coextrusion of the high and low $T_g$ layer in tubular form, the coextruded tube may be cut into discrete lengths and have a closed end and an open end formed on the ends of the cut tube, thus obtaining a preform suitable for blow molding a container. A method of extruding a multi-layer pipe, cutting the pipe to a predetermined length, forming an open end and a closed end on the cut pipe to form a parison, and blow molding the parison to form a bottle is disclosed in U.S. Pat. No. 4,261,473 to Yamada, et al., the disclosure of which is hereby incorporated herein by reference. This method is useful for extruding multi-layer preforms to form into extrusion blow molded bottles.

The multi-layer structure of the invention may be formed by injection molding. For example, the methods for forming multi-layer injection molded preforms disclosed in U.S. Pat. No. 4,535,901 to Okudaira, et al., U.S. Pat. No. 4,550,043 to Beck and U.S. Pat. No. 4,609,516 to Krishnakumar, et al., the disclosures of which are all hereby incorporated herein by reference, all disclose suitable processes for forming preforms for injection blow molded containers having the multi-layer structure of the invention.

In embodiments of the invention, the method of producing a multi-layer preform for blow molding further comprises the step of forming a second layer having an inner surface, an outer surface, an open end and an opposite end. The second layer comprises a second low $T_g$ thermoplastic material which can be the same or different than the first low $T_g$ layer comprising a thermoplastic material and at least one crystallization rate inhibitor. The total amount of crystallization rate inhibitor in each low $T_g$ layer is effective to prevent substantial haze in the low $T_g$ layers upon heating the multi-layer preform in a blow molding process to a processing temperature greater than the $T_g$ of the high $T_g$ layer. The high $T_g$ layer may be formed before the second layer having a low $T_g$, after it or at the same time. The second layer has a $T_g$ lower than the $T_g$ of the high $T_g$ layer. In this embodiment of the invention, the high $T_g$ layer is disposed between the first and second layers, resulting in a structure comprising three layers.

The challenge of thermally processing the multi-layer structure of the invention results from the different thermal and stretching properties of the high $T_g$ layer composition and the at least one layer comprising a low $T_g$ composition. As discussed above, when multilayered preforms having a layer of high $T_g$ material and at least one layer of low $T_g$ material are blow molded, the blow molding processing temperature and appropriate levels of crystallization rate inhibitors are determined by the $T_g$ and stretching properties of the high $T_g$ material. At high processing temperatures, the polyethylene terephthalate layer or layers having less than an effective amount of crystallization rate inhibitors haze before the preform can be blow molded, causing unacceptable haze in the blow molded container. Also, if the processing temperature for forming and stretching the multi-layer structure is too low, the high $T_g$ layer will be cold stretched which causes haze in that layer. If the processing temperature is low the high $T_g$ layer will not be fluid and pliable when the multi-layer structure is stretched. This will block the forces, for example, mechanical, pneumatic, and/ or vacuum forces used in the shaping processes of the multi-layer structure which induce strain crystallization by stretching the low $T_g$ layer. However, the processing temperature can not be too high or it will cause haze in the low $T_g$ layer. Furthermore, the low $T_g$ layer may start to melt flow which creates non-uniformity of the shaped multi-layer structure in a similar way to that disclosed in U.S. Pat. No. 4,803,036 to Maruhashi, et al. Also, the processing temperature should not be too hot or it will lower strain induced crystallization in the low $T_g$ layer.

Furthermore, the multi-layer structure must be forgiving enough to tolerate the normal temperature variations in commercial scale thermoplastic processing equipment, for example, multi-station blow molding machines such as those disclosed in U.S. Pat. Nos. 5,240,718 to Young et al. and U.S. Pat. No. 5,244,610 to Kitzmiller, the disclosures of which are incorporated herein by reference. This means, in embodiments of the invention, that the multi-layer material should be processable in an automated or semi-automated commercial processes with some temperature variability. These machines operate within tolerances of at least plus or minus 2° C. to 3° C., resulting in a processing temperature window of at least 4° C. to 6° C.

Adhesion between the low $T_g$ thermoplastic polyester and the high $T_g$ layer depends upon the type of polymer used for the high $T_g$ layer. Also the method of processing used to manufacture the multi-layer structure may influence the adhesion between layers. For example, whether the structure results from injection molding, co-extrusion, extrusion/lamination or lamination may influence the strength of the bond between layers. The level of adhesion between the low $T_g$ thermoplastic polyester and a polyester high $T_g$ layer is excellent, and these layers are difficult to separate into individual layers.

It may be desirable to have the ability to separate the high $T_g$ layer and the low $T_g$ layer or layers from each other for recycling, reclaiming or reprocessing. In embodiments of the invention, the multi-layer structure may further comprise a layer providing separability of layers disposed between the high and low $T_g$ layers. Moreover, in embodiments of the invention wherein there is more than one low $T_g$ layer, for example wherein the high $T_g$ layer is disposed between a first and a second low $T_g$ layer, the multi-layer structure may further comprise a second additional layer providing separability of layers disposed between the high $T_g$ layer and the second low $T_g$ layer, thereby forming a laminate comprising five layers.

In embodiments of the invention, the multi-layer structure has at least one layer selected from the group consisting of ethylene vinyl alcohol copolymers and stretchable LCPs providing separability and barrier properties to the laminate of the invention. In embodiments of the invention having two layers providing separability, the composition of such layers may be the same or different. The resulting structure may be separated into its individual layers. For example, two low $T_g$ layers, a high $T_g$ layer and two layers providing separability may be separated from a structure comprising five layers, either before or after heating and/or stretching. Thus, the structure is separable and recyclable at any point during and after its processing, for example, after the structure is formed, after the structure has been heated, after stretching and in its final container form.

As discussed above, in embodiments of the invention the multi-layer structure of the invention may comprise more than one low $T_g$ layer. This additional or second low $T_g$ layer has a $T_g$ less than the $T_g$ of the high $T_g$ layer and comprises a thermoplastic polyester and at least one crystallization rate inhibitor, the total amount of crystallization rate inhibitor being effective to prevent substantial haze in the second low $T_g$ layer. In embodiments of the invention, the total amount of crystallization rate inhibitor does not substantially inhibit strain induced crystallization of the second layer when the laminate is stretched. The additional or second low $T_g$ layer may comprise the same or different crystallization rate inhibitors as the first low $T_g$ layer and have the same or different thermoplastic polyester composition as the first low $T_g$ layer. The additional or second low $T_g$ layer may have the same thickness as the first low $T_g$ layer, or it may be thinner or thicker.

In embodiments of the invention, the multi-layer structure may further comprise at least one additional layer selected from the group consisting of an outermost heat sealing layer, an innermost U.S. Food & Drug Administration approved food contact layer, a layer comprising post-consumer recycled polymer, a barrier layer having either general or specific barrier properties such as oxygen and/or carbon dioxide barrier properties and/or moisture barrier properties, a colored layer, an ultraviolet blocking layer, an anti-flavor scalping layer located near or adjacent to the contents, and an oxygen scavenging layer. Also, in embodiments of the invention, any of the layers of the multi-layer structure may further comprise at least one additive selected from the group consisting of ultraviolet blocking agents, oxygen scavenging agents, pigments, pigment dispersants, dyes, slip agents, de-nesting agents, antistatic agents, lubricants, weathering stabilizers, antioxidants, antimicrobial agents, and inorganic fillers. The multi-layer structure of the invention may also be coated with a de-nesting composition to facilitate separation of formed parts that are nested together.

In embodiments of the invention, a multi-layer preform produced by any of the above described methods may be used for blow molding a multi-layer container of the invention. The structure of the multi-layer preform comprises a preform body defined by a multi-layer, peripheral wall which forms the preform. The multi-layer wall comprises at least one low $T_g$ layer comprising a first thermoplastic polyester, the first thermoplastic polyester comprising at least one crystallization rate inhibitor, and a high $T_g$ layer having a $T_g$ greater than the $T_g$ of the at least one first layer, preferably having a $T_g$ of at least about 85° C., the high $T_g$ layer comprising a thermoplastic material. The total amount of crystallization rate inhibitor is effective to prevent substantial haze in the low $T_g$ layer upon heating the high $T_g$ layer to a processing temperature above the $T_g$ of the high $T_g$ layer, preferably at least about 10° C. above the $T_g$ of the high $T_g$ layer, and the total amount of crystallization rate inhibitor does not substantially inhibit strain-induced crystallization of the at least one low $T_g$ layer when the laminate is stretched at the processing temperature, such that the at least one low $T_g$ layer, after the heating and stretching, is substantially transparent and has high strength.

The multi-layer preform of the invention is placed into a blow molding machine and heated to an appropriate processing or blowing temperature as described above. The multi-layer preform may have a thickness of about 80–300 mils and thus requires a certain period of time to equilibrate at the processing temperature while being heated. The time required varies according to the particular characteristics of the blow molding apparatus such as heater configuration and heater settings, as well as the characteristics of the preform such as heat conductivity, thickness, heat capacity, type of thermoplastic and the number of layers in the preform. After a sufficient time period the preform substantially equilibrates at the processing temperature. The time period is from at least about 30 seconds to no more than 4 minutes, preferably from at least about 60 seconds to about 180 seconds. During this time period, the multi-layer preform remains substantially transparent and haze free.

The heated, transparent, substantially haze-free preform may then be biaxially stretch blow molded into a container by inserting a longitudinally traveling stretch rod into the heated preform. The traveling rod stretches the container longitudinally, that is, along an axis running from the top of the container at its open end to the bottom of the container at its closed end, to stretch and orient the preform axially. This is referred to as axial drawing and the amount may be expressed as an axial draw ratio. Simultaneously, a fluid force is introduced into the container to orient the bottle in the radial direction, that is, normal to the longitudinally traveling rod. The pressurized fluid stretches and orients the heated preform in the radial direction. This is referred to as hoop drawing and the amount may be expressed as a hoop draw ratio.

The multi-layered containers of the invention have excellent thermal stability as a result of strain induced crystallization in both the high and low $T_g$ layers resulting from the stretching of the heated multi-layer laminate, for example, in the above-described stretch blow molding process. The total amount of crystallization rate inhibitor does not substantially inhibit the strain induced crystallization of the low $T_g$ layer when the preform is stretched, yet it prevents substantial haze from forming in the preform when it is heated to a blow molding temperature. The strain induced crystallization in the low $T_g$ layer prevents distortion, deformation or shrinkage when the multi-layer structure is heated to a hot use temperature. The crystalline sites formed in the low $T_g$ layer are small, so they do not affect optical properties in any substantial way. The close packed molecular structure in the low $T_g$ layer having strain induced crystallinity gives this layer greater thermal stability. This blow molding temperature is necessary in order to stretch blow mold the multi-layer preform at a temperature greater than the $T_g$ of the high $T_g$ layer so that it is not cold stretched.

A heat treating step for thermally inducing crystallinity, for example, contacting a formed article with a hot surface such as a mold maintained at around 200° C., is not required to enhance the strain induced crystallinity attained by the multi-layer laminate and process of the invention. The properties of the container, especially the heat resistance, are achieved without such a heat treating step.

In embodiments of the invention, the multi-layer structure formed from the multi-layer preform has a reduced shrinkage when subjected to a hot use temperature, such as in a hot filling process. The reduced shrinkage may be less than about 5 to 10% by volume, relative to the volume of the article prior to hot filling, preferably less than about 3% by volume and more preferably less than about 2% by volume.

In embodiments of the invention the haze level is less than about 5 per cent when the preform attains the processing temperature, preferably about 3 percent and more preferably less than about 1 percent. The haze level does not increase when the preform is blow molded, so the container retains the haze free properties during the entire process including after a hot processing step, such as hot filling.

Many multi-layer structural configurations are possible in accordance with the invention, for example: A/B, B/A, B/A', A'/B, A/B/A, A/B/A', A'/B/A, A/B/A/A', A'/A/B/A, A/F/B/ F/A, A/F/B/F/A', A'/F/B/F/A, A/F/B/A', A'/B/F/A or A/E/B/ E/A/A'. A=a low $T_g$ layer; A'=an injected low $T_g$ layer; B=a high $T_g$ layer and F=a layer providing separability. This listing of configurations is by no means exhaustive of the possible configurations that may be achieved in accordance with the present invention.

In the following Examples and Comparative Examples, measured values were determined using the following procedures and equipment:

Haze measurements were made using a Model XL-211 HAZEGARD7 System manufactured by Pacific Scientific of Silver Spring, Md.

Wall Thickness Measurements were made with a Magna-Mike7 Hall Effect Thickness Gage, Model 8000, manufactured by Panametrics of Waltham, Md.

Density Measurement and Calculation of % Crystallinity

Density measurements were performed using density columns prepared by using two separate solutions of n-heptane and Freon. The amount of each solution was calculated to give the desired upper and lower limit of the column. Glass beads of known density were added to the prepared column, allowed to equilibrate, and the column was calibrated. The container samples were placed in the column, allowed to equilibrate, and their position recorded. Their densities were determined from their positions and the calibration curve for the column.

The calculation of crystallinity is performed using the following equation:

$$\% \text{ crystallinity} = \frac{\rho - \rho(a)}{\rho(c) - \rho(a)} \times 100$$

For PET $\rho$ is the measured density, $\rho(a)$ is the density of amorphous PET (1.330 g/cm$^3$), $\rho(c)$ is the density of crystalline PET (1.455 g/cm$^3$) from the unit cell dimensions.

The volume percent loss of the multi-layer containers is determined by filling the containers with hot water and measuring the resultant volume reduction. Specifically, a water bath is heated to 85° C. The 85° C. hot water is introduced into the container to the bottom of the neck through a drain valve located at the bottom of the water bath. The hot water remains in the container for two minutes before placing the container, with the hot water still inside, into a quenching bath at a temperature of 23° C. The container remains in the quenching bath for thirty minutes to insure all shrinkage has taken place.

After removing the container from the quenching bath, the volume is measured. The difference in volumes before and after hot filling is used to calculate volume loss, and is expressed as volume percent loss.

The blowing temperature, or processing temperature, was measured by using an infrared camera to measure the surface temperature of the heated preform.

The present invention is further illustrated in the following examples. All tests were conducted according to the test procedures set forth below, unless otherwise specified. All parts, ratios, and percentages are by weight and all temperatures are in ° C., unless otherwise stated.

EXAMPLE 1

A heat resistant polyester resin comprising 60 mole percent naphthalene dicarboxylic acid, 39 mole percent terephthalic acid and 1 mole percent isophthalic acid as dicarboxylic acid units and having a $T_g$ of about 100° C. was obtained by blending 34 parts by weight of a polyester resin comprising 98.6 weight percent terephthalic acid and 1.4 weight percent isophthalic acid as dicarboxylic acid units and comprising 0.5 weight percent diethylene glycol and 99.5 weight percent ethylene glycol as diol units together with 66 parts by weight of a polyester resin comprising 90 weight percent naphthalene dicarboxylic acid and 10 weight percent terephthalic acid as dicarboxylic acid units at a temperature of 160° C. in a dry blending apparatus at 28 mm Hg vacuum for 6 hours.

The heat resistant, dry blended polyester resin was extruded in a single stage, single screw extruder at a melt temperature in the range of 295° C. to 300° C. at about 7.5 ft/min (105 lb/hr) with an average residence time in the melt system of about 20 minutes to obtain a single layer flat sheet of strain crystallizable heat resistant polyester having a thickness of 24 mils exiting the die.

The single layer of heat resistant polyester sheet was then placed in a thermoformer and heated to a sheet surface temperature in the range of 140° C. to 150° C. and thermoformed into a single layer, heat resistant insert having the shape of a cup with an open top and a closed bottom end. The average area draw ratio was about 2, resulting in an average wall thickness of 12 mils for the insert.

The thermoformed, single layer, heat resistant insert was placed into an injection molding machine having a single injection point located at the bottom center of the preform mold and an outer layer of a polyester resin comprising 10 weight percent naphthalene dicarboxylic acid and 0.7 weight percent diethylene glycol (DEG) as crystallization rate inhibitors and 90 weight percent terephthalic acid as dicarboxylic acid units and comprising 99.3 weight percent ethylene glycol as diol units, and having a $T_g$ of about 81° C. was injected onto the outermost surface of the heat resistant insert. A two layer preform was formed having an extruded, thermoformed, heat resistant polyester inner layer and an injected polyester outer layer comprising 10 weight percent naphthalene dicarboxylic acid and 0.7 weight percent DEG as crystallization rate inhibitors. The thickness of the preform was in the range of 120 to 140 mils, being thinner (around 120 mils) near the finish area and about 125 mils thick in the middle of the wall section. The ratio of the thickness of the high $T_g$ heat resistant material (about 12 mils) to the thickness of the low $T_g$ material containing crystallization rate inhibitors (about 125 mils minus about 12 mils) was from about 1:9 to 1:10, measured at about the mid point of the preform wall section.

The two layer preform was placed into a blow molding machine and heated to a blowing temperature of 119° C. After the preform substantially equilibrated at the blowing temperature it remained completely transparent and haze free. The preform was then biaxially stretch blow molded into a one liter container having an overall height of 155 mm and substantially constant diameter of about 96 mm in the wall section, having a height to diameter ratio (H:D) of about 1.6:1. The ratio of the height of the stretched portion of the container ($H_f$) to the height of the stretchable portion of the preform ($H_i$) was about 2:1.

The heat resistant container had good thermal stability as a result of strain induced crystallization in both layers. The 10 weight percent naphthalene dicarboxylic acid and 0.7 weight percent DEG as a crystallization rate inhibitors did not substantially inhibit the strain induced crystallization of the outer layer when the preform was stretched, yet they prevented haze from forming in the preform when it was heated to a blow molding temperature of about 119° C. The high $T_g$ layer made of a strain crystallizable blend comprising 60 mole percent naphthalene dicarboxylic acid may be strain crystallized during the stretch blow molding process. This blow molding temperature, or processing temperature, about 180° C. to 200° C. above the $T_g$ of the high $T_g$ material was also adequate to stretch blow mold the heat resistant layer of the two layer preform without it being cold stretched.

The volume of the heat resistant container was 983 ml after blow molding. The container was hot filled with water at 85° c and allowed to stand for 2 minutes before being placed in an ambient temperature water bath at 23° C. for 30 minutes. The volume of the container was measured after the hot filling and was 935 ml, a volume reduction of 4.9%. The container remained transparent and haze free after hot filling and cooling to ambient temperature. The average side wall thickness of the container was 0.40 mm with a standard deviation of 0.06 mm.

EXAMPLES 2A–2D

Four two-layer preforms produced from the same materials and in the same manner as the preform of Example 1 were stretch blow molded into the same container mold in the same machine and under the same conditions as in Example 1. The preforms remained transparent and haze free during the blow molding process. Haze values for three (2A, 2B & 2C) of the stretch blow molded containers were 2.1%, 2.3% & 2.5%, respectively, for an average haze value of 2.3%. A heat resistant container (2D) was hot filled and had a volume of 988 ml before hot filling at 85° C. and a volume of 930 ml after hot filling, for a volume reduction of 5.9%. The container remained transparent and haze free after hot filling and cooling to ambient temperature. The average side wall thickness of the jar was 0.41 mm with a standard deviation of 0.08 mm.

EXAMPLES 3A, 3B & 3C

Three two layer preforms were produced with a heat resistant layer having the same composition as in Examples 1 & 2A–2D, but having a thickness of 36 mils at the extruder die. All other extruder conditions were the same as in Examples 1 & 2A–2D. The composition of the injected outer layer was the same as in Examples 1 & 2A–2D and the same thermoformer and draw ratio were used to form an insert, and the same injection mold was used for the injection of the outer layer onto the insert to form the preforms. This resulted in the two layer preforms having the same overall thickness dimensions as in Examples 1 & 2A–2D, although with a thinner outer injected layer due to a thicker (about 18 mils in the preform) inner heat resistant layer. The preforms were stretch blow molded into the same container mold in the same machine and under the same conditions as in Examples 1 & 2A–2D. The preforms remained transparent and haze free during the blow molding process. Haze values for two (3A & 3B) of the stretch blow molded containers were 1.5% & 2.6%, respectively, for an average haze value of about 2.0%. A heat resistant container (3C) was hot filled and had a volume of 987 ml before hot filling at 85° C. and a volume of 945 ml after hot filling, for a volume reduction of 4.3%. The container remained transparent and haze free after hot filling and cooling to ambient temperature. The average side wall thickness of the container was 0.38 mm with a standard deviation of 0.04 mm.

COMPARATIVE EXAMPLES C1, C2 & C3

Three preforms were produced and blow molded into containers in Comparative Examples C1, C2 & C3. The same preform mold and container mold were used as in Example 1. The compositions of preforms C1, C2 & C3 were identical to the compositions of preforms 1, 2D & 3C, respectively, and the only difference in the above described process parameters was the blowing temperature of 117° C. for C1 and C2, as opposed to 119° C. for Examples 1 and 2D.

The containers formed in Comparative Examples C1, C2 & C3 were hot filled with water at 90° C. and allowed to stand for 2 minutes before being placed in an ambient temperature water bath at 23° C. for 30 minutes. The volume of the containers was measured after the hot filling and the shrinkage values obtained for Comparative Examples C1, C2 & C3 were 16.8%, 21.1% and 11.9%, respectively.

The results of Examples 1, 2D & 3C and Comparative Examples C1, C2 & C3 are summarized in Table I:

inhibitors and 95.5 weight percent terephthalic acid as the balance of the dicarboxylic acid units and comprising 99.5 weight percent ethylene glycol as the balance of the diol units, and having a $T_g$ of 76° C. was injected onto the outermost surface of the heat resistant inserts to form two

TABLE VI

| | Outer Layer | | Insert | | | side wall | side wall thickness | | Before hot filling Volume | After hot filling Volume | Volume Percent Loss |
|---|---|---|---|---|---|---|---|---|---|---|---|
| Sample | Total Inhibitor Level (wt %) | Inhibitor NDA DEG (wt %) | insert thickness (mils) | NDA (mol %) | Blowing Temp. deg C. | average thickness mm | std. deviation (mm) | hot filling temperature (deg C.) | Volume (ml) | Volume (ml) | |
| 1 | 10.7 | 10.0 NDA 0.7 DEG | 24 | 60 | 119 | 0.40 | 0.06 | 85 | 983 | 935 | 4.9 |
| 2D | 10.7 | 10.0 NDA 0.7 DEG | 24 | 60 | 119 | 0.41 | 0.08 | 85 | 988 | 930 | 5.9 |
| 3C | 10.7 | 10.0 NDA 0.7 DEG | 36 | 60 | 119 | 0.38 | 0.04 | 85 | 987 | 945 | 4.3 |
| C1 | 10.7 | 10.0 NDA 0.7 DEG | 24 | 60 | 117 | 0.40 | 0.05 | 90 | 985 | 820 | 16.8 |
| C2 | 10.7 | 10.0 NDA 0.7 DEG | 24 | 60 | 117 | 0.40 | 0.07 | 90 | 982 | 775 | 21.1 |
| C3 | 10.7 | 10.0 NDA 0.7 DEG | 36 | 60 | 119 | 0.39 | 0.09 | 90 | 987 | 870 | 11.9 |

NDA = naphthalene dicarboxylic acid
DEG = diethylene glycol

Examples 1, 2D & 3C and Comparative Examples C1, C2 & C3 show that increasing the hot filling temperature from 85° C. to 90° C. results in a large increase in the measured shrinkage values for the containers with either a 24 mil or a 36 mil thickness (prior to thermoforming) heat resistant layer comprising 60 mole percent naphthalene dicarboxylic acid. Also, a comparison of Examples 1 & 2D with Example 3C shows that there was only 20.4% (1.1/5.4×100=20.4) improvement in shrinkage achieved by a 50% increase in the thickness of the insert, which may suggest that adequate strain induced crystallinity in the high $T_g$, heat resistant layer and the low $T_g$ layer comprising at least one crystallization rate inhibitor may be achieved with the laminates and the process of the invention, without resorting to thicker, more expensive heat resistant layers.

EXAMPLES 4, 5, 6A–6C & 7A–7B

A heat resistant polyester resin comprising 60 mole per cent naphthalene dicarboxylic acid, 39 mole per cent terephthalic acid and 1 mole percent isophthalic acid as dicarboxylic acid units and having a $T_g$ of about 100° C. was obtained in the same manner as in Example 1.

The heat resistant polyester resin was extruded in the same manner as in Examples 1, 2A–2D and 3A–3C to obtain heat resistant sheets having thicknesses, after extrusion, of 24 mils in Examples 4, 5 & 6 and 36 mils in Example 7. These extruded sheets were thermoformed with a total area draw ratio of about 2 in the same manner as Examples 1, 2A–2D and 3A–3C to obtain heat resistant inserts having a cup-like shape with an open end and a closed bottom end.

The thermoformed, single layer, heat resistant inserts were placed into the same injection molding machine used in Examples 1–3 and an outer layer of a polyester resin comprising 4.5 weight percent isophthalic acid and 0.5 weight percent diethylene glycol as crystallization rate inhibitors. The same preform mold was used as in Example 1, so the thickness of the preform was in the range of 120 to 140 mils, being thinner (around 120 mils) near the finish area and about 125 mils thick in the middle of the wall section. The ratio of the thickness of the high $T_g$ heat resistant material (12 mils for Examples 4, 5 & 6A–6C) to the thickness of the low $T_g$ material containing crystallization rate inhibitors (125 mils—12 mils) was from about 1:9 to 1:10, measured at about the mid point of the preform wall section. Examples 7A & 7B had thinner outer injected layers due to a thicker (about 18 mils in the preform) inner heat resistant layer.

Each two layer preform was placed into the same blow molding machine as in Examples 1–3 and heated to a blowing temperature in a range between 116° C. and 121° C., as shown in Table II. After the preforms substantially equilibrated at the blowing temperature, they remained completely transparent and haze free. The preforms were then biaxially stretch blow molded into one liter containers having the same dimensions as in Example 1. Slight distortion was observed in the heated preform, possibly due to the lower $T_g$ of the injected material of the outer layer of the preform (76° C.), when compared to the that of the injected material of the outer layer (81° C.) of Examples 1–3.

The heat resistant containers had good thermal stability as a result of strain induced crystallization in both layers. The 4.5 weight percent isophthalic acid and 0.5 weight percent diethylene glycol as crystallization rate inhibitors did not substantially inhibit the strain induced crystallization of the outer layer when the preforms were stretched, yet they prevented haze from forming in the preforms when they were heated to a blow molding temperature in the range between 116° C. to 121° C. The high $T_g$ layer made of a strain crystallizable blend comprising 60 mole percent naphthalene dicarboxylic acid may be strain crystallized during the stretch blow molding process. This blow molding temperature, or processing temperature, about 15° C. to 20° C. above the $T_g$ of the high $T_g$ material was also adequate to stretch blow mold the heat resistant layer of the two layer C., containers C4, C6 & C7, increased by 40.3% compared to the average shrinkage for containers hot filled at 85° C., containers 4, 5, 6C & 7B.

The results of Examples 4, 5, 6C & 7B and Comparative Examples C4, C6 & C7 are summarized in Table II:

TABLE II

| | Outer Layer | | | | | side wall | | Before | | | |
|---|---|---|---|---|---|---|---|---|---|---|---|
| | Total | Inhibitor | Insert | | | side wall | thickness | | hot | After hot | |
| Sample | Inhibitor Level (wt %) | IPA DEG (wt %) | insert thickness (mils) | NDA (mol %) | Blowing Temp. deg C. | average thickness mm | std. deviation (mm) | hot filling temperature (deg C.) | filling Volume (ml) | filling Volume (ml) | Volume Percent Loss |
| 4 | 5.0 | 4.5 IPA 0.5 DEG | 24 | 60 | 118 | 0.40 | 0.05 | 85 | 987 | 885 | 10.3 |
| 5 | 5.0 | 4.5 IPA 0.5 DEG | 24 | 60 | 121 | 0.39 | 0.09 | 85 | 987 | 905 | 8.3 |
| 6C | 5.0 | 4.5 IPA 0.5 DEG | 24 | 60 | 120 | 0.38 | 0.06 | 85 | 984 | 890 | 9.6 |
| 7B | 5.0 | 4.5 IPA 0.5 DEG | 36 | 60 | 116 | 0.39 | 0.07 | 85 | 983 | 885 | 10 |
| C4 | 5.0 | 4.5 IPA 0.5 DEG | 24 | 60 | 118 | 0.40 | 0.09 | 90 | 987 | 855 | 13.4 |
| C6 | 5.0 | 4.5 IPA 0.5 DEG | 24 | 60 | 120 | 0.40 | 0.10 | 90 | 987 | 865 | 12.4 |
| C7 | 5.0 | 4.5 IPA 0.5 DEG | 36 | 60 | 116 | 0.44 | 0.10 | 90 | 987 | 845 | 14.4 |

IPA = isophthalic acid
NPA = naphthalene dicarboxylic acid
DEG = diethylene glycol preform without it being cold stretched. Haze values for three (6A, 6B & 7A) of the containers were 3.8%, 3.4% & 3.5%, respectively, for an average haze value of about 3.6%.

Several containers (4, 5, 6C & 7B) were hot filled with water at 85° C. and allowed to stand for 2 minutes before being placed in an ambient temperature water bath at 23° C. for 30 minutes. The volumes of the containers measured before and after the hot filling are listed in Table II, as well as the percent volume reduction. The containers remained transparent and haze free after hot filling and cooling to ambient temperature.

COMPARATIVE EXAMPLES C4, C6 & C7

Three preforms were produced and blow molded into containers in Comparative Examples C4, C6 & C7. The same preform mold and container mold were used as in Example 1. The compositions of preforms C4 & C6 were identical to the compositions of preforms 4 & 6C, and the blowing temperatures and other process parameters were identical also. The composition of preform C7 was identical to the composition of preform 7B, and the blowing temperature and other process parameters were identical.

The containers formed in Comparative Examples C4, C6 & C7 were hot filled with water at 90° C. and allowed to stand for 2 minutes before being placed in an ambient temperature water bath at 23° C. for 30 minutes. The volume of the containers was measured before and after the hot filling and the shrinkage values for Comparative Examples C4, C6 & C7 were 13.4%, 12.4% and 14.4%, respectively. Thus, the average shrinkage for containers hot filled at 90°

COMPARATIVE EXAMPLES C8–C26

In Comparative Examples C8–C26, nineteen preforms were produced and blow molded into containers having the same dimensions as in Example 1. The mole percent of naphthalene dicarboxylic acid in the heat resistant layer was one of three values; 60 percent ($T_g$ about 100° C.), 67.5 percent ($T_g$ about 105° C.) or 75 percent ($T_g$ about 110° C.). The 60 percent composition was obtained in the same manner as in the previous Examples and the 67.5 and 75 mole percent compositions were obtained by increasing the amount of resin comprising 90 weight percent naphthalene dicarboxylic acid contained in the blend that the heat resistant layer was prepared from. The thickness of the extruded heat resistant layer was varied from 12 to 24 mils, in increments of three mils.

The thermoformed, single layer, heat resistant inserts were placed into the same injection molding machine used in Examples 1–3 and an outer layer of a polyester resin comprising 1.5 weight percent isophthalic acid and 1.4 weight percent diethylene glycol as crystallization rate inhibitors and 98.5 weight percent terephthalic acid as the balance of the dicarboxylic acid units and comprising 98.6 weight percent ethylene glycol as the balance of the diol units, and having a $T_g$ of 76° C. was injected onto the outermost surface of the heat resistant inserts to form two layer preforms having the same dimensions as in Example 1.

The blowing temperature was varied between 104° C. to 132° C. Although many of the containers obtained had volume reduction values less than 10% after hot filling, and some containers had volume reduction values of around 6% or less, none of the preforms could be heated to the blowing temperature without developing haze. Thus, all of the containers formed by blow molding had haze because total amount of crystallization rate inhibitor was insufficient to prevent haze when the preform was heated to the processing temperature, with the exception that Comparative Example C10 had haze due to cold stretching the high $T_g$ layer at a processing temperature of 104° C. The results of Comparative Examples C8–C26 are summarized in Table III:

COMPARATIVE EXAMPLES C27–C34

Eight preforms were produced and blow molded into containers in Comparative Examples C27–C34. The eight preforms and containers were produced in the same manner as in Comparative Examples C8–C26. The mole percent of naphthalene dicarboxylic acid in the heat resistant layer was one of three values; 60 percent ($T_g$ about 100° C.), 67.5 percent ($T_g$ about 105° C.) or 75 percent ($T_g$ about 110° C.).

The thickness of the extruded heat resistant layer was varied from 12 to 24 mils, in increments of three or six mils. The eight preforms were stretch blow molded into containers having the same dimensions and in the same manner as in Comparative Examples C8–C26. The same outer layer material as used in Comparative Examples C8–C26, a polyester resin comprising 1.5 weight percent isophthalic acid and 1.4 weight percent diethylene glycol as crystallization rate inhibitors, was injected onto the outermost surface of the heat resistant inserts to form two layer preforms.

The blowing temperature was from about 115° C. to about 125° C. None of the preforms could be heated to the blowing temperature without developing haze, because total amount of crystallization rate inhibitor was insufficient to prevent haze when the preform was heated to the processing temperature, and the haze values for Comparative Examples C27–C36 are shown in Table IV:

TABLE III

| | Outer Layer | | | | | side wall | | | |
| | Total | Inhibitor | Insert | | | side wall | thickness | | |
| Sample | Inhibitor Level (wt %) | IPA DEG (wt %) | insert thickness (mils) | NDA (mol %) | Blowing Temp. deg C. | average thickness mm | std. deviation (mm) | hot filling temperature (deg C.) | Volume Percent Loss |
| --- | --- | --- | --- | --- | --- | --- | --- | --- | --- |
| C8 | 2.9 | 1.5 IPA 1.4 DEG | 18 | 60 | 122 | 0.43 | 0.20 | 85 | 12.2 |
| C9 | 2.9 | 1.5 IPA 1.4 DEG | 18 | 60 | 121 | 0.36 | 0.05 | 85 | 5.4 |
| C10 | 2.9 | 1.5 IPA 1.4 DEG | 18 | 60 | 104 | 0.40 | 0.04 | 85 | 3.0 |
| C11 | 2.9 | 1.5 IPA 1.4 DEG | 18 | 60 | 112 | 0.39 | 0.05 | 85 | 8.0 |
| C12 | 2.9 | 1.5 IPA 1.4 DEG | 18 | 60 | 116 | 0.39 | 0.05 | 85 | 7.1 |
| C13 | 2.9 | 1.5 IPA 1.4 DEG | 18 | 60 | 123 | 0.37 | 0.07 | 85 | 4.9 |
| C14 | 2.9 | 1.5 IPA 1.4 DEG | 18 | 60 | 121 | 0.36 | 0.07 | 85 | 6.3 |
| C15 | 2.9 | 1.5 IPA 1.4 DEG | 15 | 67.5 | 124 | 0.39 | 0.12 | 85 | 12 |
| C16 | 2.9 | 1.5 IPA 1.4 DEG | 21 | 67.5 | 121 | 0.38 | 0.06 | 85 | 6 |
| C17 | 2.9 | 1.5 IPA 1.4 DEG | 12 | 75 | 125 | 0.43 | 0.23 | 85 | 17 |
| C18 | 2.9 | 1.5 IPA 1.4 DEG | 18 | 75 | 127 | 0.39 | 0.09 | 85 | 8 |
| C19 | 2.9 | 1.5 IPA 1.4 DEG | 24 | 75 | 126 | 0.39 | 0.07 | 85 | 10 |
| C20 | 2.9 | 1.5 IPA 1.4 DEG | 18 | 60 | 121 | 0.37 | 0.06 | 90 | 8 |
| C21 | 2.9 | 1.5 IPA 1.4 DEG | 18 | 60 | 128 | 0.37 | 0.08 | 90 | 13 |
| C22 | 2.9 | 1.5 IPA 1.4 DEG | 21 | 67.5 | 121 | 0.39 | 0.08 | 90 | 10 |
| C23 | 2.9 | 1.5 IPA 1.4 DEG | 12 | 75 | 125 | 0.50 | 0.15 | 90 | 25 |
| C24 | 2.9 | 1.5 IPA 1.4 DEG | 18 | 75 | 132 | 0.50 | 0.16 | 90 | 21 |
| C25 | 2.9 | 1.5 IPA 1.4 DEG | 24 | 75 | 126 | 0.42 | 0.12 | 90 | 13 |
| C26 | 2.9 | 1.5 IPA 1.4 DEG | 21 | 67.5 | 121 | 0.41 | 0.09 | 95 | 17 |

IPA = isophtalic acid
NDA = naphthalene dicarboxylic acid
DEG = diethylene glycol

TABLE IV

| | Outer Layer | | | | |
| --- | --- | --- | --- | --- | --- |
| | Total | Inhibitor | Insert | | |
| Sample | Inhibitor Level (wt %) | IPA DEG (wt %) | insert thickness (mils) | NDA (mol %) | Haze % |
| C27 | 2.9 | 1.5 IPA 1.4 DEG | 18 | 60 | 12.5 |
| C28 | 2.9 | 1.5 IPA 1.4 DEG | 18 | 60 | 13.2 |
| C29 | 2.9 | 1.5 IPA 1.4 DEG | 15 | 67.5 | 15.3 |
| C30 | 2.9 | 1.5 IPA 1.4 DEG | 15 | 67.5 | 14.7 |
| C31 | 2.9 | 1.5 IPA 1.4 DEG | 12 | 75 | 16.9 |
| C32 | 2.9 | 1.5 IPA 1.4 DEG | 12 | 75 | 18.5 |
| C33 | 2.9 | 1.5 IPA 1.4 DEG | 24 | 75 | 20.5 |
| C34 | 2.9 | 1.5 IPA 1.4 DEG | 24 | 75 | 21.8 |

IPA = isophthalic acid
NPA = naphthalene dicarboxylic acid
DEG = diethylene glycol

EXAMPLES 9-1, 9-2, 9-3, 10-1, 10-2 & 10-3

A heat resistant polyester resin comprising 60 mole per cent naphthalene dicarboxylic acid, 39 mole percent terephthalic acid and 1 mole percent isophthalic acid as dicarboxylic acid units and having a $T_g$ of about 100° C. was obtained in the same manner as in Examples 1–3.

The heat resistant polyester resin was extruded in the same manner as in Examples 1–3 to obtain heat resistant sheets having thicknesses, after extrusion, of 30 mils for Examples 9-1, 9-2 & 9-3 and 36 mils for Examples 10-1, 10-2 & 10-3. These extruded sheets were thermoformed in the same manner as in Examples 1–3 to obtain heat resistant inserts having a cup-like shape with an open end and a closed bottom end.

The thermoformed, single layer, heat resistant inserts were placed into the same injection molding machine used in Examples 1–3 and an outer layer of a polyester resin comprising 4.5 weight percent isophthalic acid and 0.5 weight percent diethylene glycol as crystallization rate inhibitors and 95.5 weight percent terephthalic acid as the balance of the dicarboxylic acid units and comprising 99.5 weight percent ethylene glycol as the balance of the diol units, and having a $T_g$ of about 76° C. was injected onto the outermost surface of the heat resistant inserts to form two layer preforms of the same dimensions as in Example 1 and having a heat resistant polyester inner layer and a polyester outer layer comprising 4.5 weight percent isophthalic acid and 0.5 weight percent diethylene glycol as crystallization rate inhibitors. The thickness of the preforms were the same as in the prior Examples and in the range of 120 to 140 mils, being thinner (around 120 mils) near the finish area and about 125 mils thick in the middle of the wall section. The ratio of the thickness of the high $T_g$ heat resistant material, for the preforms based on a 36 mil extruded heat resistant layer (about 18 mils in the insert) to the thickness of the low $T_g$ material containing crystallization rate inhibitors (about 125 mils minus about 18 mils) was about 1:6. The ratio of the thickness of the high $T_g$ heat resistant material, for the preforms based on a 30 mil extruded heat resistant layer (about 15 mils in the insert) to the thickness of the low $T_g$ material containing crystallization rate inhibitors (about 125 mils minus about 15 mils) was from about 1:7 to about 1:8.

The two layer preforms were placed into the same blow molding machine as used in Examples 1–3 and heated to a blowing temperature in the range of 117° C. to 121° C., as shown in Table V. After the preforms substantially equilibrated at the blowing temperature they remained completely transparent and haze free. The preforms were then biaxially stretch blow molded into a one liter container having an overall height of 185 mm and substantially constant diameter of about 87 mm in the wall section, having a height to diameter ratio (H:D) of about 2.1:1. The ratio of the height of the stretched portion of the container ($H_f$) to the height of the stretchable portion of the preform ($H_i$) was about 2.5:1.

The heat resistant containers had good thermal stability as a result of strain induced crystallization in both layers. The 4.5 weight percent isophthalic acid and 0.5 weight percent diethylene glycol as crystallization rate inhibitors did not substantially inhibit the strain induced crystallization of the outer layer when the preforms were stretched, yet they prevented haze from forming in the preforms when they were heated to a blow molding temperature in the range between 117° C. to 121° C. The high $T_g$ layer made of a strain crystallizable blend comprising 60 mole percent naphthalene dicarboxylic acid may be strain crystallized during the stretch blow molding process. This blow molding temperature, or processing temperature, about 15° C. to 20° C. above the $T_g$ of the high $T_g$ material was also adequate to stretch blow mold the heat resistant layer of the two layer preform without it being cold stretched.

The containers were hot filled with water at 85° C. and allowed to stand for 2 minutes before being placed in an ambient temperature water bath at 23° C. for 30 minutes. The volumes of the containers measured before and after the hot filling are listed in Table V, as well as the percent volume reduction. The containers remained transparent and haze free after hot filling and cooling to ambient temperature. The results of Examples 9-1, 9-2, 9-3, 10-1, 10-2 & 10-3 are summarized in Table V:

TABLE V

| | Outer Layer | | Insert | | | side wall | side wall | | Before | After hot | |
|---|---|---|---|---|---|---|---|---|---|---|---|
| | Total | Inhibitor | | | | | thickness | | hot | | |
| Sample | Inhibitor Level (wt %) | IPA DEG (wt %) | insert thickness (mils) | NDA (mol %) | Blowing Temp. deg C. | average thickness mm | std. deviation (mm) | hot filling temperature (deg C.) | filling Volume (ml) | filling Volume (ml) | Volume Percent Loss |
| 9-1 | 5.0 | 4.5 IPA 0.5 DEG | 30 | 60 | 119 | 0.36 | 0.06 | 85 | 984 | 950 | 3.5 |
| 9-2 | 5.0 | 4.5 IPA 0.5 DEG | 30 | 60 | 120 | 0.39 | 0.05 | 85 | 984 | 950 | 3.5 |
| 9-3 | 5.0 | 4.5 IPA 0.5 DEG | 30 | 60 | 120 | 0.37 | 0.05 | 85 | 985 | 945 | 4.2 |
| 10-1 | 5.0 | 4.5 IPA 0.5 DEG | 36 | 60 | 118 | 0.34 | 0.07 | 85 | 984 | 950 | 3.5 |
| 10-2 | 5.0 | 4.5 IPA 0.5 DEG | 36 | 60 | 121 | 0.34 | 0.05 | 85 | 984 | 950 | 3.5 |
| 10-3 | 5.0 | 4.5 IPA 0.5 DEG | 36 | 60 | 117 | 0.32 | 0.05 | 85 | 985 | 938 | 4.8 |

IPA = isophthalic acid
NDA = naphthalene dicarboxylic acid
DEG = diethylene glycol

EXAMPLES 11-1, 11-2, 11-3, 12-1, 12-2 & 12-3

A heat resistant polyester resin comprising 60 mole per cent naphthalene dicarboxylic acid, 39 mole percent terephthalic acid and 1 mole percent isophthalic acid as dicarboxylic acid units and having a $T_g$ of about 100° C. was obtained in the same manner as in Examples 1–3.

The heat resistant polyester resin was extruded in the same manner as in Examples 1–3 to obtain heat resistant sheets having thicknesses, after extrusion, of 24 mils and 36 mils. These extruded sheets were thermoformed in the same manner as in Examples 1–3 to obtain heat resistant inserts having a cup-like shape with an open end and a closed bottom end.

The thermoformed, single layer, heat resistant inserts were placed into the same injection molding machine used in Examples 1–3 and an outer layer of a polyester resin comprising 10 weight percent naphthalene dicarboxylic acid (NDA) and 0.7 weight percent diethylene glycol (DEG) as crystallization rate inhibitors and 90 weight percent terephthalic acid as dicarboxylic acid units and comprising 99.5 weight percent ethylene glycol as diol units, and having a $T_g$ of 81° C. was injected onto the outermost surface of the heat resistant inserts to form two layer preforms having the same dimensions as in Example 1 and having a heat resistant polyester inner layer and a polyester outer layer comprising 10 mole percent naphthalene dicarboxylic acid and 0.7 weight percent diethylene glycol as crystallization rate inhibitors. The thickness of the preforms were the same as in the prior Examples and in the range of 120 to 140 mils, being thinner (around 120 mils) near the finish area and about 125 mils thick in the middle of the wall section. The ratio of the thickness of the high $T_g$ heat resistant material, for the preforms based on a 36 mil extruded heat resistant layer (about 18 mils in the insert) to the thickness of the low $T_g$ material containing crystallization rate inhibitors (about 125 mils minus about 18 mils) was about 1:6. The ratio of the thickness of the high $T_g$ heat resistant material, for the preforms based on a 24 mil extruded heat resistant layer (about 12 mils in the insert) to the thickness of the low $T_g$ material containing crystallization rate inhibitors (about 125 mils minus about 12 mils) was from about 1:9 to about 1:10.

The two layer preforms were placed into the same blow molding machine as used in Examples 1–3 and heated to a blowing temperature in the range of 117° C. to 119° C., as shown in Table VI. After the preforms substantially equilibrated at the blowing temperature they remained completely transparent and haze free. The preforms were then biaxially stretch blow molded into a one liter container having an overall height of 185 mm and substantially constant diameter of about 87 mm in the wall section, having a height to diameter ratio (H:D) of about 2.1:1. The ratio of the height of the stretched portion of the container ($H_f$) to the height of the stretchable portion of the preform ($H_i$) was about 2.5:1.

The heat resistant containers had good thermal stability as a result of strain induced crystallization in both layers. The 10.0 weight percent naphthalene dicarboxylic acid and 0.7 weight percent diethylene glycol as crystallization rate inhibitors did not substantially inhibit the strain induced crystallization of the outer layer when the preforms were stretched. The strain induced crystallinity of the outer layer comprising PET modified with NDA and DEG was 24% for Examples 11-1 and 11-3, and was 25% for Examples 12-1 and 12-3. The injected outer layer was substantially amorphous prior to the stretch blow molding process, and effectively all of the crystallinity in the outer layer was attained by the stretch blow molding process. This high level of strain induced crystallinity was achieved in the outer layer while the crystallization rate inhibitors simultaneously prevented haze from forming in the preforms when they were heated to a blow molding temperature in the range between 117° C. to 119° C. The high $T_g$ layer made of a strain crystallizable blend comprising 60 mole percent naphthalene dicarboxylic acid was also strain crystallized during the stretch blow molding process. The strain induced crystallinity of the high $T_g$ layer made of a strain crystallizable blend comprising 60 mole percent naphthalene dicarboxylic acid was 18% for Examples 11-1 and 11-3, and was 16% for Examples 12-1 and 12-3. The strain crystallizable high $T_g$ layer comprising 60 mole percent NDA was substantially amorphous after extrusion and had 0.5% crystallinity, and effectively all of the crystallinity in the strain crystallizable high $T_g$ layer was attained by the stretch blow molding process.

The blow molding temperature, or processing temperature, about 15° C to 20° C. above the $T_g$ of the high $T_g$ material was also adequate to stretch blow mold the heat resistant layer of the two layer preform without it being cold stretched.

The containers were hot filled with water at 85° C. and allowed to stand for 2 minutes before being placed in an ambient temperature water bath at 23° C. for 30 minutes. The volumes of the containers measured before and after the hot filling are listed in Table VI, as well as the percent volume reduction. The containers remained transparent and haze free after hot filling and cooling to ambient temperature. The results of Examples 11-1, 11-2, 11-3, 12-1, 12-2 & 12-3 are summarized in Table VI:

a 5 mil thick central COTBPR layer were cut in 7 by 7 inch pieces. These multilayer sheets were then thermoformed at $145_1°$ C. to form an insert. Average insert thickness after thermoforming was 20 mils indicating an average draw ratio of 1.24. The inserts were placed over the core of an injection molding machine and an outer layer of resin modified with at least one crystallization rate inhibitor was injected into the mold to form a preform. The injected outer layer resin comprised 10 weight percent naphthalene dicarboxylic acid and 0.7 weight percent diethylene glycol as crystallization rate inhibitors, the same injected resin as in Examples 1 1 and 12. In this step, molten resin comprising 10 weight % NDA and 0.7 wt % DEG was injected onto the outer surface of the three layer thermoformed insert, to form a four layer preform having the structure:

(PET MODIFIED WITH NDA & DEG)/PETIP/ COTBPR/PETIP

The preforms were then reheated up to 145° C. and stretch blowmolded into a 500 ml wide mouth container having a

TABLE VI

| | Outer Layer | | Insert | | | side wall | side wall thickness | | Before hot | After hot | |
|---|---|---|---|---|---|---|---|---|---|---|---|
| Sample | Total Inhibitor Level (wt %) | Inhibitor NDA DEG (wt %) | insert thickness (mils) | NDA (mol %) | Blowing Temp. deg C. | average thickness mm | std. deviation (mm) | hot filling temperature (deg C.) | filling Volume (ml) | filling Volume (ml) | Volume Percent Loss |
| 11-1 | 10.7 | 10.0 NDA 0.7 DEG | 24 | 60 | 117 | 0.35 | 0.04 | 85 | 986 | 970 | 1.6 |
| 11-2 | 10.7 | 10.0 NDA 0.7 DEG | 24 | 60 | 117 | 0.32 | 0.03 | 85 | 985 | 962 | 2.3 |
| 11-3 | 10.7 | 10.0 NDA 0.7 DEG | 24 | 60 | 119 | 0.35 | 0.03 | 85 | 986 | 962 | 2.4 |
| 12-1 | 10.7 | 10.0 NDA 0.7 DEG | 36 | 60 | 118 | 0.32 | 0.04 | 85 | 985 | 955 | 3.2 |
| 12-2 | 10.7 | 10.0 NDA 0.7 DEG | 36 | 60 | 119 | 0.34 | 0.04 | 85 | 983 | 955 | 2.8 |
| 12-3 | 10.7 | 10.0 NDA 0.7 DEG | 36 | 60 | 119 | 0.35 | 0.04 | 85 | 984 | 955 | 2.9 |

NDA = naphthalene dicarboxylic acid
DEG = diethylene glycol

In Table V it can be seen that the thicker heat resistant layer provides no improvement in shrinkage for the crystallization rate inhibitor comprising 4.5 weight percent isophthalic acid and 0.5 weight percent diethylene glycol, while Table VI shows that the shrinkage actually increases with an increase in the thickness of the heat resistant layer for a low $T_g$ layer having 10 weight percent NDA and 0.7 weight percent DEG as crystallization rate inhibitors. Examples 11-1 to 11-3 and 12-1 to 12-3 clearly show that adequate strain induced crystallinity is attained both in the thin high $T_g$, heat resistant layer and in the low $T_g$ layer comprising at least one crystallization rate inhibitor in an amount sufficient to prevent haze. Such strain induced crystallinity is achieved with the cost-effective laminates and the process of the invention, without resorting to thicker, more expensive heat resistant layers. Of course, the thin heat resistant layer must have enough thickness to resist the shrinkage forces of the outer layer during hot filling, so in this respect there is a functional lower limit to the thickness of the heat resistant layer, depending upon the particular application.

EXAMPLE 13: LAMINATES COMPRISING STRETCHABLE LCP

Multilayer sheets having 10 mil PETIP (a PET copolymer with 17.5 wt % isophthalic acid) polyester on either side of uniform COTBPR layer without fractures or tears throughout the wall section and excellent transparency. The haze level of the container may be 2% or less. The COTBPR layer thickness in the wall area measured 0.45 mil. This thickness measurement indicates a total area draw ratio of 11.1 for the COTBPR layer in the container.

What is claimed is:

1. A multi-layer laminate comprising:
    at least one low $T_g$ layer comprising a first thermoplastic polyester, said first thermoplastic polyester comprising at least one crystallization rate inhibitor, and
    a high $T_g$ layer having a $T_g$ of at least 85° C. and greater than the $T_g$ of said at least one low $T_g$ layer, said high $T_g$ layer comprising a thermoplastic material,
    wherein the total amount of crystallization rate inhibitor is effective to minimize haze in said low $T_g$ layer upon heating the high $T_g$ layer to a processing temperature at least 10° C. above the $T_g$ of said high $T_g$ layer and wherein the total amount of crystallization rate inhibitor does not prevent attaining a strain-induced crystallization of at least 15% of the at least one low $T_g$ layer when said laminate is stretched at said processing temperature such that the at least one low $T_g$ layer after said heating and stretching is substantially transparent as evidenced by a haze level less than 5%.

2. A multi-layer laminate as claimed in claim 1 wherein said high $T_g$ layer is substantially transparent as evidenced by a haze level less than 5% and has strain-induced crystallinity after said heating and stretching.

3. A multi-layer laminate as claimed in claim 2 in a form selected from the group consisting of a preform, a container and a blow-molded container, all of said forms having a total thickness, wherein said laminate has a single, thin high $T_g$ layer and the thickness of said thin high $T_g$ layer is less than 25% of the total thickness of the multi-layer laminate.

4. A multi-layer laminate as claimed in claim 3 wherein said thin high $T_g$ layer is a processing aid and during said heating and stretching the at least one low $T_g$ layer is uniformly distributed.

5. A multi-layer laminate as claimed in claim 4 wherein said laminate is heated and stretched into a bottle having a sidewall portion, and the standard deviation of the sidewall portion thickness is 0.07 mm or less.

6. A multi-layer laminate as claimed in claim 4 wherein said laminate is heated and stretched into a bottle having a sidewall portion, and the standard deviation of the sidewall portion thickness is 0.05 mm or less.

7. A multi-layer laminate as claimed in claim 4 wherein said stretched laminate is a multi-layer polyester bottle having less than 15 weight percent naphthalene dicarboxylic acid as carboxylic acid units and said bottle has an 85° C. hot-fill shrinkage value of less than 3.5 volume percent.

8. A multi-layer laminate as claimed in claim 7 wherein said laminate has less than 4% haze.

9. A multi-layer laminate as claimed in claim 4 wherein said stretched laminate is a multi-layer polyester bottle having less than 20 weight percent naphthalene dicarboxylic acid as carboxylic acid units and said bottle has an 85° C. hot-fill shrinkage value of less than 2.0 volume percent.

10. A multi-layer laminate as claimed in claim 9 wherein said laminate has less than 2.5% haze.

11. A multi-layer laminate as claimed in claim 3 wherein said laminate has a tensile strength of at least 20,000 psi.

12. A multi-layer laminate as claimed in claim 3 wherein the thickness of said single high $T_g$ layer is less than 10 per cent the total thickness of multi-layer laminate.

13. A multi-layer laminate as claimed in claim 2 wherein said high $T_g$ thermoplastic material comprises a strain crystallizable blend derived from terephthalic acid units and naphthalene dicarboxylic acid units and having from about 40 mole per cent to about 80 mole percent naphthalene dicarboxylic acid.

14. A multi-layer laminate as claimed in claim 1 wherein said high $T_g$ thermoplastic material is selected from the group consisting of polyacrylates, polyacrylonitriles, polyarylates, polycarbonates, polystyrenes, polyethylene naphthalate, blends of polyethylene terephthalate and polyethylene naphthalate, copolymers of polyethylene terephthalate and polyethylene naphthalate, blends of one or more of said high $T_g$ thermoplastic materials, and copolymers of one or more of said high $T_g$ thermoplastic materials.

15. A multi-layer laminate as claimed in claim 1 wherein said at least one crystallization rate inhibitor is selected from the group consisting of 1,2-, 1,3-, 1,4-, 1,5-, 1,6-, 1,7-, 1,8-, 2,3-, 2,4-, 2,5-, 2,6-, 2,7- and 2,8- isomers of naphthalen dicarboxylic acid or a derivative thereof, isophthalic acid or a derivative thereof, diphenyl-4,4' dicarboxylic acid or a derivative thereof, 4,4'-diphenyletherdicarboxylic acid or a derivative thereof, sebacic acid or a derivative thereof, decane-1,10-dicarboxylic acid or a derivative thereof, adipic acid or a derivative thereof, glutaric acid or a derivative thereof, fumaric acid or a derivative thereof, stilbenedicargboxylic acid or a derivative thereof, azelaic acid or a derivative thereof, biphenyldicarboxylic acid or a derivative thereof, cyclohexanedicarboxylic acid or a derivative thereof, cyclopropanedicarboxylic acid or a derivative thereof, propanediol or a derivative thereof, propylene glycol or a derivative thereof, trimethylene glycol or a derivative thereof, diethylene glycol or a derivative thereof, butanediol or a derivative thereof, tetramethylene glycol or a derivative thereof, pentamethylene glycol or a derivative thereof, hexanediol or a derivative thereof, hexamethylene glycol or a derivative thereof, decamethylene glycol or a derivative thereof, neopentylene glycol or a derivative thereof, cyclohexanediol or a derivative thereof and cyclohexanedimethanol or a derivative thereof.

16. A multi-layer laminate as claimed in claim 1 wherein said first thermoplastic polyester is selected from the group consisting of polyethylene terephthalate, post consumer recycled polyester, and blends of polyethylene terephthalate and post consumer recycled polyester.

17. A multi-layer laminate as claimed in claim 1 wherein said low $T_g$ layer comprises from about 2 weight percent to about 15 weight percent of said at least one crystallization rate inhibitor.

18. A multi-layer laminate as claimed in claim 1 wherein said low $T_g$ layer comprises from about 4 weight percent to about 9 weight percent of said at least one crystallization rate inhibitor.

19. A multi-layer laminate as claimed in claim 1, further comprising at least one additional layer selected from the group consisting of an outermost heat sealing layer, an innermost FDA approved food contact layer, a layer comprising post-consumer recycled polymer, an oxygen barrier layer, a carbon dioxide barrier layer, a moisture barrier layer, a colored layer, an ultraviolet blocking layer, an oxygen scavenging layer, and a second low $T_g$ layer comprising a second thermoplastic polymer, said second thermoplastic polyester comprising at least one crystallization rate inhibitor, and wherein the total amount of crystallization rate inhibitor in said second low $T_g$ layer is effective to minimize haze in said second low $T_g$ layer upon heating the high $T_g$ layer to a processing temperature at least 10° C. above the $T_g$ of said high $T_g$ layer and wherein the total amount of crystallization rate inhibitor does not prevent attaining a strain-induced crystallization of at least 15% of said second low $T_g$ layer when said laminate is stretched at said processing temperature such that said second low $T_g$ layer after said heating and stretching is substantially transparent as evidenced by a haze level less than 5%.

20. A multi-layer laminate as claimed in claim 19 wherein said high $T_g$ layer is disposed between said at least one low $T_g$ layer and said second low $T_g$ layer.

21. A multi-layer laminate as claimed in claim 19 wherein said second low $T_g$ layer comprises from about 2 weight per cent to about 15 weight per cent of said at least one crystallization rate inhibitor.

22. A multi-layer laminate as claimed in claim 19 wherein said second low $T_g$ layer comprises from about 4 per cent to about 9 weight per cent of said at least one crystallization rate inhibitor.

23. A multi-layer laminate as claimed in claim 19 wherein at least one of said layers further comprises at least one additive selected from the group consisting of ultraviolet blocking agents, oxygen scavenging agents, pigments, pigment dispersants, dyes, slip agents, de-nesting agents, antistatic agents, lubricants, weathering stabilizers, antioxidants, antimicrobial agents, and inorganic fillers.

24. A multi-layer laminate as claimed in claim 19 wherein said barrier layer selected from the group consisting of a moisture barrier layer, a carbon dioxide barrier layer and an oxygen barrier layer is disposed between the high $T_g$ layer and the low $T_g$ layer.

25. A multi-layer laminate as claimed in claim 24 further comprising a second barrier layer selected from the group consisting of a moisture barrier layer, a carbon dioxide barrier layer and an oxygen barrier layer, said second barrier layer disposed between the high $T_g$ layer and the second low $T_g$ layer, thereby forming a laminate comprising five layers.

26. A multi-layer laminate as claimed in claim 25 wherein said barrier layers provide separability of layers to said multi-layer laminate.

27. A multi-layer laminate as claimed in claim 1 wherein said processing temperature defines a lower limit of a processing temperature range, said processing temperature range having an upper limit cool enough not to prevent a strain-induced crystallization of at least 15% in said at least one low $T_g$ layer.

28. A multi-layer laminate as claimed in claim 27 wherein said processing temperature range upper limit is 30° C. greater than the $T_g$ of the high $T_g$ layer.

29. A multi-layer laminate as claimed in claim 1 wherein said low $T_g$ layer and said high $T_g$ layer are coextruded to form said multi-layer laminate, and wherein said coextruded multi-layer laminate is thermoformed into a shape having an innermost surface and an outermost surface.

30. A multi-layer laminate as claimed in claim 29 further comprising an injection molded outer layer comprising a thermoplastic material, said outer layer being in contact with said outermost surface.

31. A multi-layer laminate as claimed in claim 1 in a sheet form.

32. A multi-layer laminate as claimed in claim 1 wherein said low $T_g$ layer has at least 20% strain-induced crystallinity and said high $T_g$ layer has at least 15% strain-induced crystallinity.

33. A multi-layer laminate as claimed in claim 1 wherein said laminate has a single, very thin high $T_g$ layer and the thickness of said high $T_g$ layer is less than 5% of the thickness of the multilayer laminate.

34. A multi-layer laminate as claimed in claim 33 wherein said high $T_g$ layer comprises a wholly aromatic, amorphous liquid crystalline polymer.

35. A multi-layer laminate as claimed in claim 34 wherein the thickness of said high $T_g$ layer is less than 1% of the thickness of the multi-layer laminate.

36. A multi-layer laminate as claimed in claim 34 wherein said processing temperature defines a lower limit of a processing temperature range, said processing temperature range having an upper limit cool enough not to prevent attaining a strain-induced crystallization of at least 15% in said at least one low $T_g$ layer.

37. A multi-layer laminate as claimed in claim 36 wherein said processing temperature range upper limit is 40° C. greater than the $T_g$ of the high $T_g$ layer and said high $T_g$ layer has a modulus above $T_g$ of at least $2.5 \times 10^5$ psi in the machine direction.

38. A multi-layer laminate as claimed in claim 33 wherein said high $T_g$ layer comprises a wholly aromatic, amorphous liquid crystalline polymer and said high $T_g$ layer is a processing aid and during said heating and stretching the liquid crystalline polymer high $T_g$ layer and the at least one low $T_g$ layer are uniformly distributed.

39. A multi-layer laminate as claimed in claim 38 wherein said low $T_g$ layer has at least 20% strain-induced crystallinity.

40. A multi-layer laminate as claimed in claim 1 wherein the $T_g$ of the at least one low $T_g$ layer is less than 85° C.

41. A multi-layer laminate comprising:
at least one low $T_g$ layer comprising a first thermoplastic polyester, said first thermoplastic polyester comprising at least one crystallization rate inhibitor, and
a high $T_g$ layer comprising a wholly aromatic, amorphous, stretchable liquid crystalline polymer wherein said high $T_g$ layer is stretchable at a temperature below a molten state of the liquid crystalline polymer, and wherein said high $T_g$ layer has a $T_g$ of at least 85° C. and greater than the $T_g$ of said at least one low $T_g$ layer,
wherein the total amount of crystallization rate inhibitor is effective to minimize haze in said low $T_g$ layer upon heating the high $T_g$ layer to a processing temperature at least 10° C. above the $T_g$ of said high $T_g$ layer and stretching said laminate at said processing temperature such that the at least one low $T_g$ layer after said heating and stretching is substantially transparent as evidenced by a haze level less than 5%.

42. A multi-layer laminate as claimed in claim 41 wherein said liquid crystalline polymer is a polyester and has repeat units corresponding to the general formula:

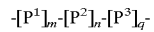

wherein $P^1$, $P^2$ and $P^3$ represent residues of monomeric moieties; with $P^1$ being aromatic hydroxy monocarboxylic acid; $P^2$ being an aromatic dicarboxylic acid; and $P^3$ being a phenolic compound; and m, n and q represent mole percent of the respective monomers with m=n=q=about 5 to about 40 percent individually.

43. The multi-layer laminate of claim 42, additionally containing repeat units of monomeric moieties $[P^4]_r$ and $-[P^5]_s$ where $[P^4]_r$ is a second aromatic hydroxy carboxylic acid different from $P^1$, $-[P^5]_s$ is a diphenol moiety different from $P^3$, with r and s representing mole percent of the respective monomers, r being about 5 to about 20 mole percent, and s being about 5 to about 20 mole percent.

44. A multi-layer laminate as claimed in claim 41 wherein said liquid crystalline polymer is a polyester having recurring monomer units derived from terephthalic acid, 6-hydroxy-2-naphthoic acid, p-hydroxybenzoic acid, 4,4'-biphenol, and resorcinol.

45. A multi-layer container comprising:
a container body defined by a multi-layer, peripheral wall which forms the container, said multi-layer wall comprising;

at least one low $T_g$ layer comprising a first thermoplastic polyester, said first thermoplastic polyester comprising at least one crystallization rate inhibitor, and a high $T_g$ layer comprising a wholly aromatic, amorphous, stretchable liquid crystalline polymer wherein said high $T_g$ layer is stretchable at a temperature below a molten state of the liquid crystalline polymer, and wherein said high $T_g$ layer has a $T_g$ of at least 85° C. and greater than the $T_g$ of said at least one low $T_g$ layer, wherein the total amount of crystallization rate inhibitor is effective to minimize haze in said low $T_g$ layer upon heating the high $T_g$ layer to a temperature above the $T_g$ of said high $T_g$ layer as evidenced by a haze level less than 5%.

46. A multi-layer laminate comprising:

at least one low $T_g$ layer comprising a first thermoplastic polyester, said first thermoplastic polyester comprising at least one crystallization rate inhibitor, and a high $T_g$ layer having a $T_g$ of at least 85° C. and greater than the $T_g$ of said at least one first layer, said high $T_g$ layer comprising a thermoplastic material, wherein the total amount of crystallization rate inhibitor is effective to minimize haze in said low $T_g$ layer upon heating the high $T_g$ layer to a temperature above the $T_g$ of said high $T_g$ layer and wherein the total amount of crystallization rate inhibitor does not prevent attaining a strain-induced crystallization of at least 15% of the at least one low $T_g$ layer such that the at least one low $T_g$ layer is substantially transparent as evidenced by a haze level less than 5%.

47. A substantially transparent heat resistant multi-layer container, as evidenced by a haze level less than 5%, comprising at least one low $T_g$ layer comprising a first thermoplastic polyester, said first thermoplastic polyester comprising at least one crystallization rate inhibitor, and a high $T_g$ layer having a $T_g$ of at least 85° C. and greater than the $T_g$ of said at least one first layer, said high $T_g$ layer comprising a thermoplastic material, said container having less than 15% weight percent naphthalene dicarboxylic acid as carboxylic acid units and having an 85° C. hot-fill shrinkage value of less than about 3.5 volume percent.

48. A substantially transparent heat resistant multi-layer container, as evidenced by a haze level less than 5%, comprising at least one low $T_g$ layer comprising a first thermoplastic polyester, said first thermoplastic polyester comprising at least one crystallization rate inhibitor, and a single high $T_g$ layer having a $T_g$ of at least about 85° C. and greater than the $T_g$ of said at least one first layer, said high $T_g$ layer comprising a thermoplastic material, wherein said high $T_g$ layer is less than 25% of the thickness of the multi-layer container, and said container has an 85° C. hot-fill shrinkage value of less than 3.5 volume percent.

49. A substantially transparent heat resistant multi-layer container as claimed in claim 48 wherein said container has an 85° C. hot-fill shrinkage value of less than 2.0 volume percent.

* * * * *